United States Patent
Bonisoli et al.

(10) Patent No.: US 8,872,376 B2
(45) Date of Patent: Oct. 28, 2014

(54) METHOD FOR GENERATING ELECTRIC ENERGY IN A TIRE

(75) Inventors: Elvio Bonisoli, Turin (IT); Sandro Moos, Turin (IT); Maurizio Repetto, Turin (IT); Stefano Tornincasa, Turin (IT); Fabio Freschi, Turin (IT); Federico Mancosu, Milan (IT); Massimo Brusarosco, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 196 days.

(21) Appl. No.: 13/504,620

(22) PCT Filed: Oct. 28, 2010

(86) PCT No.: PCT/IB2010/002794
§ 371 (c)(1),
(2), (4) Date: Apr. 27, 2012

(87) PCT Pub. No.: WO2011/051800
PCT Pub. Date: May 5, 2011

(65) Prior Publication Data
US 2012/0211997 A1      Aug. 23, 2012

Related U.S. Application Data

(60) Provisional application No. 61/272,814, filed on Nov. 6, 2009.

(30) Foreign Application Priority Data

Oct. 30, 2009   (IT) .............................. MI2009A1901

(51) Int. Cl.
H02P 9/04 (2006.01)
B60C 23/04 (2006.01)
H02K 35/02 (2006.01)
H02K 7/18 (2006.01)

(52) U.S. Cl.
CPC .............. *B60C 23/041* (2013.01); *H02K 35/02* (2013.01); *H02K 7/1846* (2013.01); *H02K 7/1876* (2013.01)
USPC .......................................................... 290/55

(58) Field of Classification Search
USPC ................................... 290/55, 1 R; 310/75 R
See application file for complete search history.

(56) References Cited

U.S. PATENT DOCUMENTS 3,699,367 A    10/1972   Thomas
4,405,872 A *   9/1983   Thomas ...................... 310/75 R (Continued)

FOREIGN PATENT DOCUMENTS

CN         1647351        7/2005
EP      1 700 351 B1     10/2007

(Continued)

OTHER PUBLICATIONS

Mann et al; "Energy Harvesting from the Nonlinear Oscillations of Magnetic Levitation", Science Direct, Journal of Sound and Vibration 319, pp. 515-530, 2009.

(Continued)

*Primary Examiner* — Truc Nguyen
(74) *Attorney, Agent, or Firm* — Finnegan, Henderson, Farabow, Garrett & Dunner, L.L.P.

(57) ABSTRACT

A method and system for generating electric energy in a tire includes a device including a housing that extends according to a longitudinal axis X, at least one electrical winding, a magnet movable within the housing along the longitudinal axis, and a force providing element positioned at at least one of two opposite ends of the housing, which is adapted to exert on the magnet a force along said longitudinal axis. The device is fixed on a crown portion of the tire; the tire is rotated on a rolling surface so as to determine variations of forces that act on the device every time the device passes, due to the rolling of the tire, at a footprint of the tire; the force exerted by the force providing element and the variations of forces along the longitudinal axis are exploited so as to cause variations of the magnet position with respect to the at least one electrical winding; and the electric energy generated across the at least one electrical winding as a consequence of the variations of the position of the magnet with respect to the electrical winding is collected.

15 Claims, 16 Drawing Sheets

(56) References Cited

U.S. PATENT DOCUMENTS

| | | | |
|---|---|---|---|
| 6,291,901 B1 * | 9/2001 | Cefo | 290/1 R |
| 7,089,099 B2 * | 8/2006 | Shostak et al. | 701/29.6 |
| 7,285,868 B2 * | 10/2007 | Wilson | 290/1 R |
| 7,363,806 B2 * | 4/2008 | Huang et al. | 73/146 |
| 2003/0155771 A1 | 8/2003 | Cheung et al. | |
| 2004/0155467 A1 | 8/2004 | Cheung et al. | |
| 2008/0264537 A1 | 10/2008 | Behrends et al. | |
| 2009/0115591 A1 | 5/2009 | Mancosu et al. | |

FOREIGN PATENT DOCUMENTS

| | | |
|---|---|---|
| JP | 2004-187429 | 7/2004 |
| WO | WO 2005/067073 A1 | 7/2005 |
| WO | WO 2007/000781 A1 | 1/2007 |
| WO | WO 2008/062377 A2 | 5/2008 |
| WO | WO 2009/080374 A1 | 7/2009 |

OTHER PUBLICATIONS

International Search Report from the European Patent Office for International Application No. PCT/IB2010/002794, mailing date Mar. 3, 2011.

English language translation of First Office Action from the State Intellectual Property Office of the People's Republic of China (11 pages).

\* cited by examiner

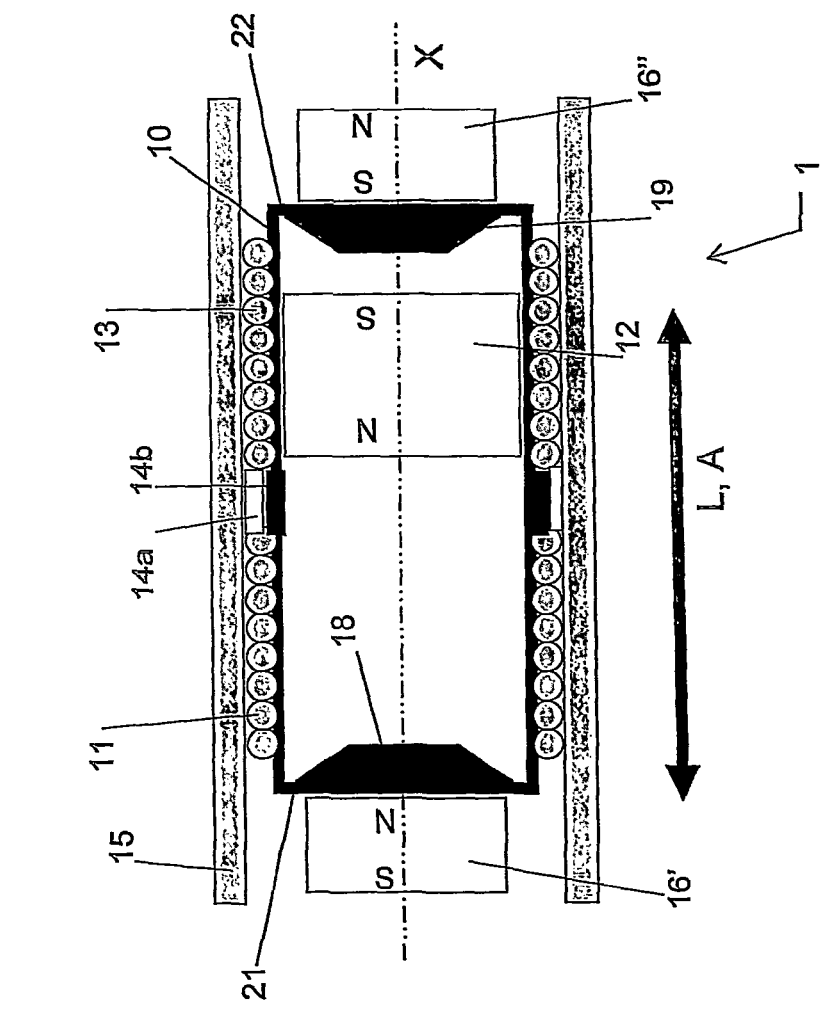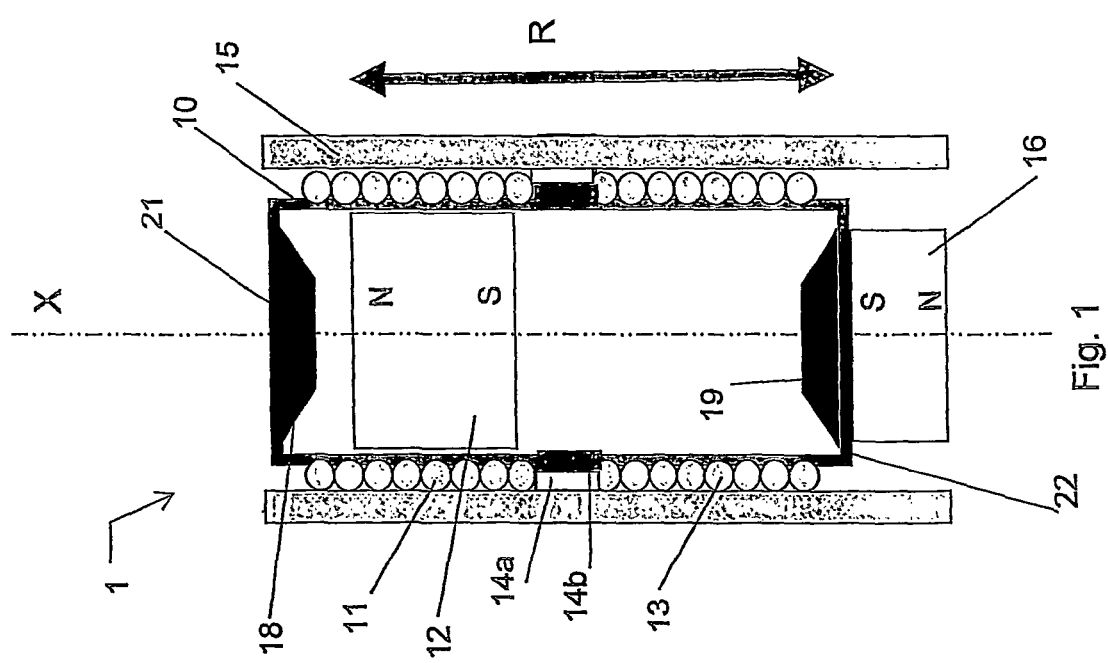

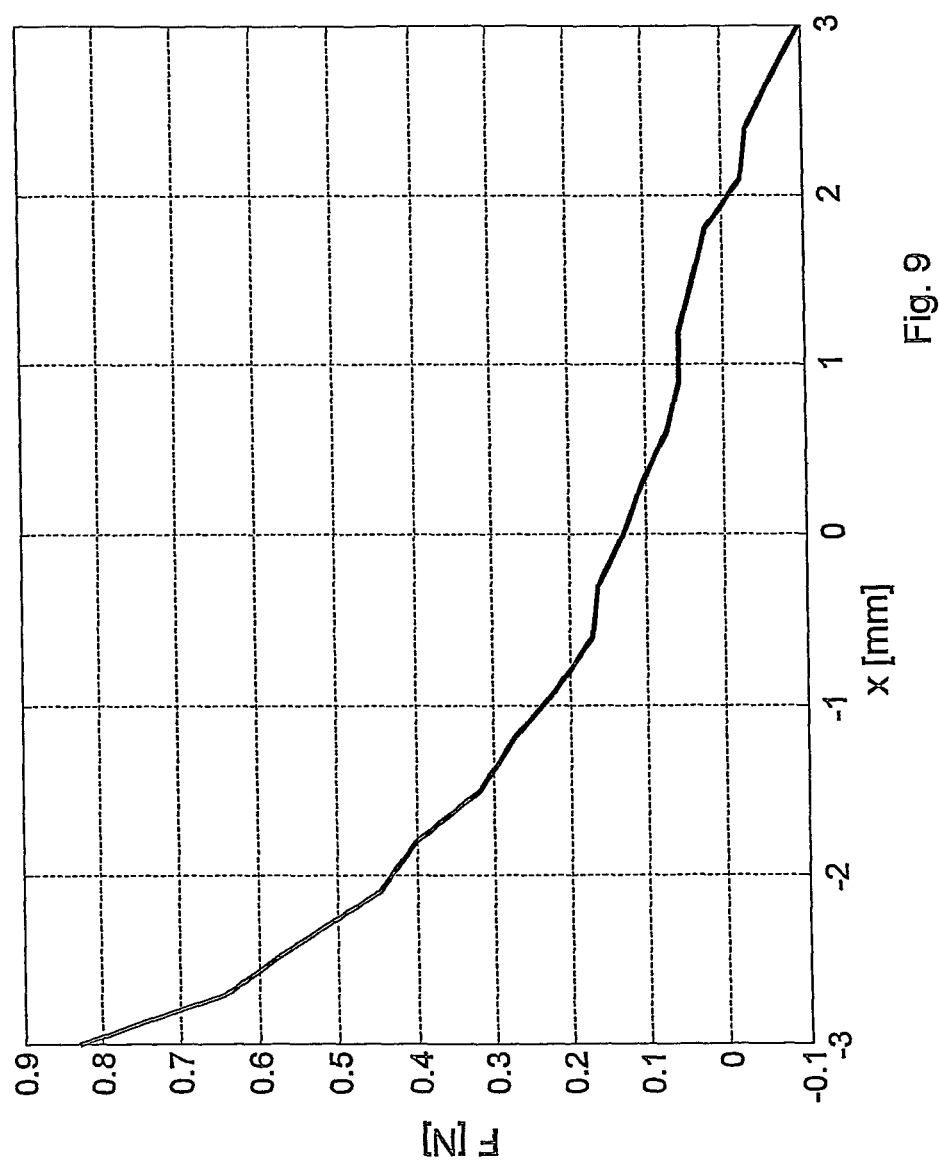

METHOD FOR GENERATING ELECTRIC ENERGY IN A TIRE

CROSS REFERENCE TO RELATED APPLICATIONS

This application is a national phase application based on PCT/IB2010/002794, filed Oct. 28, 2010, which claims the priority of Italian patent application no. MI2009A001901, filed Oct. 30, 2009, and the benefit of U.S. Provisional Application No. 61/272,814, filed Nov. 6, 2009, the content of all of which is incorporated herein by reference.

BACKGROUND OF THE INVENTION

1. Field of the Invention

The invention relates to a method and system for generating electric energy in a tire. The word "tire" is referred to as "tyre" in the remainder of the specification, and the terms are intended to be used interchangeably.

2. Description of the Related Art

The generation of electric energy in a tyre can be useful for feeding electronic devices associated with the tyre.

The incorporation of electronic devices inside tyres is having increasing importance in order to increase the safety of vehicles. Such devices can, for example, include sensors and other components adapted to obtain information concerning various magnitudes of a tyre like, for example, temperature, pressure, acceleration, number of revolutions of the tyre, speed of the vehicle or actuators, like pumps adapted to keep the pressure inside the tyre substantially constant. Such devices can also include a transmitter (typically wireless) to send outside the tyre (typically to an on board control unit of the vehicle) the information obtained through the sensors and a microprocessor adapted to collect and process the signals coming from the sensors, before transmission. Optionally, such devices can also include a receiver (typically wireless) to receive possible information from the outside (for example, from an on board control unit of the vehicle).

EP 1 700 351 describes a process and a system for generating electric energy inside a tyre wherein a housing including a piezoelectric element is coupled with a tyre portion at a tread area of the tyre. The piezoelectric element is arranged along a plane perpendicular to a radial direction of the tyre and has a first end fixed to the housing and a second end fixed to a load mass. A gap is formed between an inner wall of the housing and an outer surface of said load mass. The piezoelectric element, the load mass and the gap are sized so as to obtain: a) during the rotation of the tyre on a rolling surface at a first rotation speed below a given speed, an oscillation within said gap of the load mass fixed to the piezoelectric element; and b) during the rotation of the tyre on the rolling surface at a second rotation speed above said given speed, a contact of the load mass with the inner wall of the housing, during a first fraction of a complete tyre revolution, and an oscillation within the gap of the load mass fixed to the piezoelectric element, during a second fraction of a complete tyre revolution. During the first fraction of tyre revolution the tread area is not in contact with the rolling surface, whereas during the second fraction the tread area is in contact with the rolling surface.

US 2008/0264537 describes a tyre module to detect various parameters on the conditions of a tyre, comprising a spring element locked to one end and a conversion unit, wherein kinetic energy is converted into electric energy. In an inductive embodiment of the conversion unit, the module has a cylindrical symmetry with a permanent magnet placed inside it, along the axis of the cylinder. The ferromagnetic circuit closes by means of the walls of the cylinder. The spring element has a circular or concentric leaf design and is fixed onto a cover of the cylinder. A seismic mass is arranged at the centre of the leafed elastic element, at the axis of the cylinder. Depressions, preferably concentric, make the leafed elastic element oscillating. The space between the permanent magnet and the seismic mass varies due to the acceleration jumps during the passage along the contact area of the tyre with the road, thus varying the magnetic flux in the ferromagnetic circuit. The variation of magnetic flux can be converted into an electrical voltage by means of an appropriate winding. In another inductive embodiment of the conversion unit, the module comprises a spring element, a permanent magnet fixed to the free end of the spring element and a winding fixed onto the fixed end of the spring element.

U.S. Pat. No. 7,285,868 describes a technique for generating electric energy in a tyre that exploits the load induced by the deflection of the inner walls of the tyre at the shoulder, close to the tread. In a radial embodiment, the energy generator comprises a chamber mounted on the inner surface of the tread, a magnet fixed to the base of the chamber, a winding movable along a guide tube, a spring fixed to one of the two inner walls, a cable and rollers. When the tread at the generator reaches the contact region with the road, the inner walls of the tyre get squashed, the centrifugal force generated by the rotation of the tyre goes to zero and the spring-cable-rollers system pulls the winding towards the rim, generating a voltage pulse. When, on the other hand, the tread comes out from the contact region with the road, the inner walls of the tyre get stretched, the centrifugal force generated by the rotation of the tyre is restored and pushes the winding towards the inner surface of the tread, generating a second voltage pulse.

U.S. Pat. No. 7,285,868 also describes a horizontal embodiment in which the energy generator comprises a chamber mounted horizontally that is fixed through two attachment devices to the inner walls at the shoulder of the tyre. The chamber comprises a magnet movable inside a guide tube around which a winding is wound. The alternating movement of the inner walls, that get squashed within the contact region with the road and get stretched outside the contact region, causes a movement of the magnet with respect to the winding.

B. P. Mann and N. D. Sims ("Energy harvesting from the nonlinear oscillations of magnetic levitation", Journal of sound and Vibration 319 (2009), 515-530) describe the results of an analysis carried out on the generation of electric energy on the basis of vibrations through a magnetic system comprising a teflon tube having two magnets at the two ends. The magnets are mechanically fixed to two respective threaded supports and their distance can be varied by making them slide along such supports. The system also comprises a central magnet positioned inside the tube between the other two magnets. The magnetic poles are oriented so as to repel the central magnet thus suspending it with a non-linear restoration force. Moreover, the system comprises an upper winding and a lower winding wound around the tube, respectively on an upper half and a lower half of the outer surface of the tube. The authors analyse the behaviour of the device under harmonic excitation.

WO 2008/062377 describes a device for converting into electric energy the mechanical energy associated with the vibrations generated by vibration means connected to the device. The device comprises at least one electromagnetic stator with a coaxial winding and a magnetic mass that is movable with respect to the stator. The stator, the winding and the magnetic mass form a magnetic circuit. The magnetic mass moves perpendicularly to the axis of the winding in response to vibrations generated by the vibration means, varying the distance between the stator and the magnetic mass. When the magnetic mass is far from the stator, the electromagnetic circuit is open and the overall reluctance of the magnetic circuit is high. When the magnetic mass is in contact with the stator, the magnetic circuit is closed and the overall reluctance of the magnetic circuit is low. Consequently, the position of the movable magnetic mass influences the overall reluctance of the magnetic circuit and therefore the value of the magnetic flux coupled on the winding.

SUMMARY OF THE INVENTION

The Applicant faced the technical problem of generating electric energy in a tyre through a device that is compact, small in size (for example less than 2 cm$^3$), robust, resistant to high rotation speeds of the tyre (for example over 280 km/h), which allows the generation of significant energy values even at low rotation speeds of the tyre (for example 30-40 km/h). Moreover, the Applicant faced the technical problem of providing a device capable of supplying a high ratio between generated average power and volume occupied by the device (for example greater than 1 mW/cm$^3$).

The Applicant has also faced the technical problem of feeding complex monitoring systems of a tyre that—with respect to simple monitoring systems—require significant supply energy values (for example corresponding to average powers over the time of at least 1-2 mW) both at low and at high rotation speeds of the tyre. By complex monitoring systems it is meant systems suitable for monitoring, processing and transmitting to an on board control unit of the vehicle a large amount of data (for example at least 180-200 kbit/s) with high sampling/transmission frequencies (for example once for every tyre revolution). An example of a complex monitoring system is the Cyber™ Tyre system developed by the Applicant capable of detecting and sending data about the temperature of the tyre, the pressure and the triaxial accelerations, which are generated by the interaction between the rubber and the asphalt (longitudinal, lateral and radial acceleration), to a control unit arranged on board the vehicle and of also receiving information and data from the vehicle, useful for its operation. By simple monitoring systems it is meant systems adapted to monitor, process and transmit, to an on board control unit of the vehicle, a limited amount of data (for example, 200 bit/s) with very low sampling/transmission frequencies (for example once every 5-10 minutes). Examples of simple monitoring systems are TPMS (Tyre Pressure Monitor System) type systems adapted to monitor the pressure of the tyre, which typically require energy supply values corresponding to average powers of few tens of µW.

The Applicant has found that such a technical problem can be solved by associating with a tyre a device comprising a magnet movable along a direction of movement, at least one electrical winding and a force providing element adapted to exert a force on the magnet along such a direction of movement. By exploiting the force exerted by the force providing element and the variations undergone by forces that act on the device essentially every time it passes, due to the rolling of the tyre, in correspondence of a footprint of the tyre, the position of the magnet can be varied with respect to the at least one electrical winding so as to generate electric energy across at least one electrical winding.

The Applicant has found that such a device can generate high average power values (for example even of 10-14 mW) in rolling speed ranges that can normally be reached by tyres (for example 120-180 km/h), and can obtain high ratios between generated average power and volume occupied by the device (for example even of 8-11 mW/cm$^3$).

In a first aspect thereof the present invention relates to a method for generating electric energy in a tyre, the method comprising:
fixing a device on a crown portion of the tyre, said device comprising a housing that extends according to a longitudinal axis X, at least one electrical winding, a magnet movable within the housing and a force providing element positioned at least one of two opposite ends of the housing, the magnet being movable with respect to the electrical winding along said longitudinal axis X and the force providing element being adapted to exert on the magnet a force along said longitudinal axis X;
rotating the tyre on a rolling surface so as to determine variations of forces that act on the device every time said device passes, due to the rolling of the tyre, in correspondence of a footprint of the tyre;
exploiting the force exerted by the force providing element and said variations of forces along said longitudinal axis X so as to cause variations of the magnet position with respect to the at least one electrical winding;
collecting the electric energy generated across the at least one electrical winding as a consequence of said variations of the position of the magnet with respect to the at least one electrical winding.

In the rest of the description and in the subsequent claims:
the expression "crown portion" of a tyre is used to indicate a portion of the tyre that extends between the sidewalls thereof according to a lateral direction of the tyre;
the terms "lateral" and "laterally" are used to indicate magnitudes measured in a direction parallel to the axis of rotation of the tyre;
the terms "radial" and "radially" are used to indicate magnitudes measured in a direction perpendicular to the axis of rotation of the tyre;
the terms "longitudinal" and "longitudinally", when used with reference to the tyre, are used to indicate magnitudes measured tangentially to the tyre and perpendicularly to the lateral direction and to the radial direction.

The forces acting on the device during the rolling of the tyre on said rolling surface can be splitted into a radial force, a lateral force and a longitudinal force.

Advantageously, it is exploited variations of intensity, along the longitudinal axis X of the housing, that the radial force, the lateral force and/or the longitudinal force acting on the device have during each complete tyre revolution.

Advantageously, it is exploited variations of intensity, along the longitudinal axis X of the housing, that the radial force, the lateral force and/or the longitudinal force acting on the device have at each complete tyre revolution, every time said device passes, due to the rolling of the tyre, in correspondence of a footprint of the tyre.

Advantageously, it is exploited variations of intensity, along the longitudinal axis X of the housing, that the radial force, the lateral force and/or the longitudinal force acting on the device have as the rolling speed of the tyre varies.

Advantageously, said device is fixed onto a radially inner portion of said crown portion. Preferably, said device is fixed onto a radially inner surface of said crown portion.

Advantageously, said at least one electrical winding comprises a plurality of turns arranged around a winding axis.

Advantageously, the magnet and the electrical winding are positioned with respect to one another so that variations of the position of the magnet along said longitudinal axis X within said housing cause variations of the magnetic flux that is coupled by the turns of the at least one winding.

Advantageously, the axis of said at least one winding is parallel to the longitudinal axis X. This allows the device to be made more compact.

Advantageously, the axis of said at least one winding coincides with the longitudinal axis X.

Advantageously said at least one winding is wound around the outer surface of the housing.

In a preferred embodiment, the device comprises at least two electrical windings. The at least two electrical windings are advantageously connected in counter-series. By electrical windings connected in counter-series it is meant two equidirected windings positioned in series with the proximal end of one connected to the distal end of the other, or else counter-directed windings positioned in series with the two proximal or distal ends connected together.

The at least two electrical windings are wound around the outer surface of the housing at distinct portions.

Advantageously, the magnet has one dimension, along said longitudinal axis X of the housing, no longer than the dimension, along said axis X, of one of said at least two electrical windings. The magnet can, however, have a dimension, along said longitudinal axis X, longer than the dimension, along said axis X, of one of said at least two windings.

The at least two electrical windings are advantageously spaced apart by a spacer. In an embodiment, the spacer comprises a ring made from magnetically inactive material. In another embodiment, the spacer comprises two coaxial rings of which one is made from magnetically inactive material and one is made from ferromagnetic material. Preferably, the inner one is made from magnetically inactive material and the outer one is made from ferromagnetic material.

In an embodiment, the device comprises at least one inner winding and at least one outer winding that are coaxial. Advantageously, the at least one inner winding and the at least one outer winding are configured so as to be selectively connected in series or in parallel (for example through a suitable switch), depending on the electrical voltage to be outputted by the device. This solution can, for example, be advantageous when the device is used to feed an external load having a minimum limit and a maximum limit of supply voltage. Indeed, the windings, normally connected in counter-series so as to ensure a voltage greater than the aforementioned minimum limit, can be switched into a parallel connection when the voltage outputted by the device exceeds the maximum limit (for example 5V). The switching can be carried out automatically by the device itself or under the action of an external command.

In an embodiment, the housing can be surrounded by an outer element. The housing and the outer element are preferably coaxial. The outer element advantageously comprises ferromagnetic material. This enables to avoid dispersions of magnetic flux and to concentrate it within the device, allowing better efficiency of the device.

Advantageously, the two ends of the housing are closed by suitable covers.

Advantageously, the housing also comprises a damper element adapted to attenuate the impact of the movable magnet with the two ends of the housing.

In an embodiment, the damper element comprises two bumpers positioned at the two ends of the housing, for example on the inner surface of the two covers. The bumpers are advantageously made with a highly elastic elastomeric mixture. In a preferred embodiment, the bumpers can have a frusto-conical shape.

In an alternative embodiment, the damping effect can be provided by the air (or other fluid) enclosed within the housing.

In a preferred embodiment, the force providing element and the movable magnet are configured so that, at a predetermined rolling speed of interest of the tyre, every time the device is outside a footprint, the movable magnet is (except for oscillations) in an operating position in which the pattern $(d\lambda/dx)$ of the total magnetic flux $\lambda$ coupled by the turns of said at least two windings versus the position of the movable magnet along the axis X of the housing has a maximum gradient. As explained more clearly below, this allows the electric voltage generated across said at least two windings due to oscillations of the magnet around such an operating position to be maximised.

Moreover, the force providing element and the movable magnet are advantageously also configured so that in the aforementioned operating position of the movable magnet the device has its own resonance frequency substantially corresponding to a frequency associated with a higher-order contribution peak of the forces acting on the energy generation device along said axis X of the housing, at the predetermined rolling speed of interest of the tyre. As explained more clearly below, this enables to best exploit the aforementioned higher-order contributions (i.e. events that occur more than once per revolution of the tyre) in order to generate electric voltage across said at least two windings due to oscillations at frequencies corresponding to such contributions.

In an embodiment, the force providing element is adapted to exert on the magnet a repulsive force whose absolute value increases as the magnet approaches the end where the force providing element is positioned.

In a preferred embodiment, the force exerted by the force providing element is a magnetic force.

In another embodiment, the force exerted by the force providing element is an elastic force.

In a first embodiment, the force providing element comprises a preload magnet adapted to exert a magnetic preload force on the movable magnet so as to keep it in a determined rest position when the tyre is not rotating.

In a variant of said first embodiment, the force providing element can comprise an elastic spring or an element made from elastic material (for example with open cells). Preferably, the elastic spring is of the type with variable elastic constant (for example a helicoidal or "cup" spring).

In the case of said first embodiment of the force providing element, the device is advantageously fixed onto the tyre so that the axis X of the housing is substantially parallel to a radial direction of the tyre. Moreover, the force providing element is advantageously positioned in correspondence of only one of the two ends of the housing (for example, on the outer surface of one of the two covers), which, according to a radial direction of the tyre, faces towards the outside the tyre itself. In addition, the force providing element is advantageously adapted to exert on the magnet a force directed, according to a radial direction of the tyre, towards the inside of the tyre. In the aforementioned rest position the movable magnet is preferably positioned at one of the two ends of the housing that, according to a radial direction of the tyre, faces towards the inside of the tyre.

In a second embodiment, the force providing element comprises two preload magnets adapted to exert a preload force on the movable magnet so as to keep it in a certain rest position when the tyre is not rotating.

In a variant of the aforementioned second embodiment, the force providing element comprises two elastic springs or two elements made from elastic material (for example with open cells). The elastic springs are preferably of the type with variable elastic constant (for example helicoidal or "cup" springs).

In the case of the second embodiment of the force providing element, the device is advantageously fixed onto the tyre so that the axis X of the housing is substantially parallel to a lateral or longitudinal direction of the tyre. Moreover, the force providing element is advantageously positioned in correspondence of both the two ends of the housing (for example, on the outer surface of the two covers).

Advantageously, the method also comprises feeding the electric energy collected to at least one sensor adapted to measure at least one operating parameter of the tyre, and/or to a transmitter, and/or to a microprocessor and/or to a receiver associated with the tyre.

Advantageously, the tyre is rotated on the rolling surface at least one speed of between 20 km/h and 320 km/h.

In a second aspect thereof the present invention also concerns a tyre comprising:
  a crown portion;
  a monitoring device comprising at least one sensor adapted to measure at least one operating parameter of the tyre;
  an energy generation device associated with said crown portion of the tyre adapted to feed energy to said monitoring device;
wherein:
  said energy generation device comprises a housing extending according to a longitudinal axis X, at least one electrical winding, a magnet movable within the housing and a force providing element at least one of two opposite ends of the housing, the magnet being movable with respect to the electrical winding along said longitudinal axis X and the force providing element being adapted to exert on the magnet a force along said longitudinal axis X; and wherein
  said at least one electrical winding, said magnet and said force providing element are configured so that the position of the movable magnet with respect to the at least one electrical winding varies during the rolling of the tyre due to the force exerted by the force providing element and to variations undergone by forces acting on the device every time said device passes, due to the rolling of the tyre, in correspondence of a footprint of the tyre.

In a preferred embodiment, the device is fixed onto the tyre so that the longitudinal axis X of the housing is substantially parallel to a radial direction of the tyre.

In another embodiment, the device is fixed onto the tyre so that the longitudinal axis X of the housing is substantially parallel to a lateral direction of the tyre.

In another embodiment, the device is fixed onto the tyre so that the longitudinal axis X of the housing is substantially parallel to a longitudinal direction of the tyre.

Advantageously, the monitoring device also comprises a transmitter device, operatively associated with said at least one sensor, adapted to transmit data relative to the parameter measured by said at least one sensor, towards the outside of the tyre, for example towards a control unit arranged on the vehicle.

Advantageously, the monitoring device also comprises a receiver device adapted to receive data or commands from the outside of the tyre, for example from a control unit arranged on the vehicle.

Advantageously, the monitoring device also comprises a processing unit (for example a microprocessor) adapted to process signals coming from said at least one sensor in order to extract monitoring data.

Advantageously, said at least one sensor comprises an acceleration sensor.

Advantageously, the sensor is capable of detecting effects of the interaction of the tyre with the rolling surface.

Advantageously, said at least one sensor comprises a pressure sensor.

Advantageously, said at least one sensor comprises a temperature sensor.

Advantageously, said at least one sensor comprises a tyre revolution counter.

As far as concern further structural and functional features of the second aspect of the invention reference is made to what already described above with reference to the first aspect of the invention.

BRIEF DESCRIPTION OF THE DRAWINGS

Further characteristics and advantages of the present invention will become clear from the following detailed description of some explicative embodiments thereof, provided solely as examples and not for limiting purposes, said description being made with reference to the attached drawings, in which:

FIG. 1 schematically shows a longitudinal section view of a first embodiment of an energy generation device that can be used in a tyre according to the invention;

FIG. 2 schematically shows a longitudinal section view of a second embodiment of an energy generation device that can be used in a tyre according to the invention;

FIG. 9 shows an example of magneto-elastic force exerted in an energy generation device according to the embodiment of FIG. 1 by a preload magnet on a movable magnet, versus the position x of the movable magnet along the longitudinal axis X of the device;

DETAILED DESCRIPTION OF THE INVENTION

Figure 3:
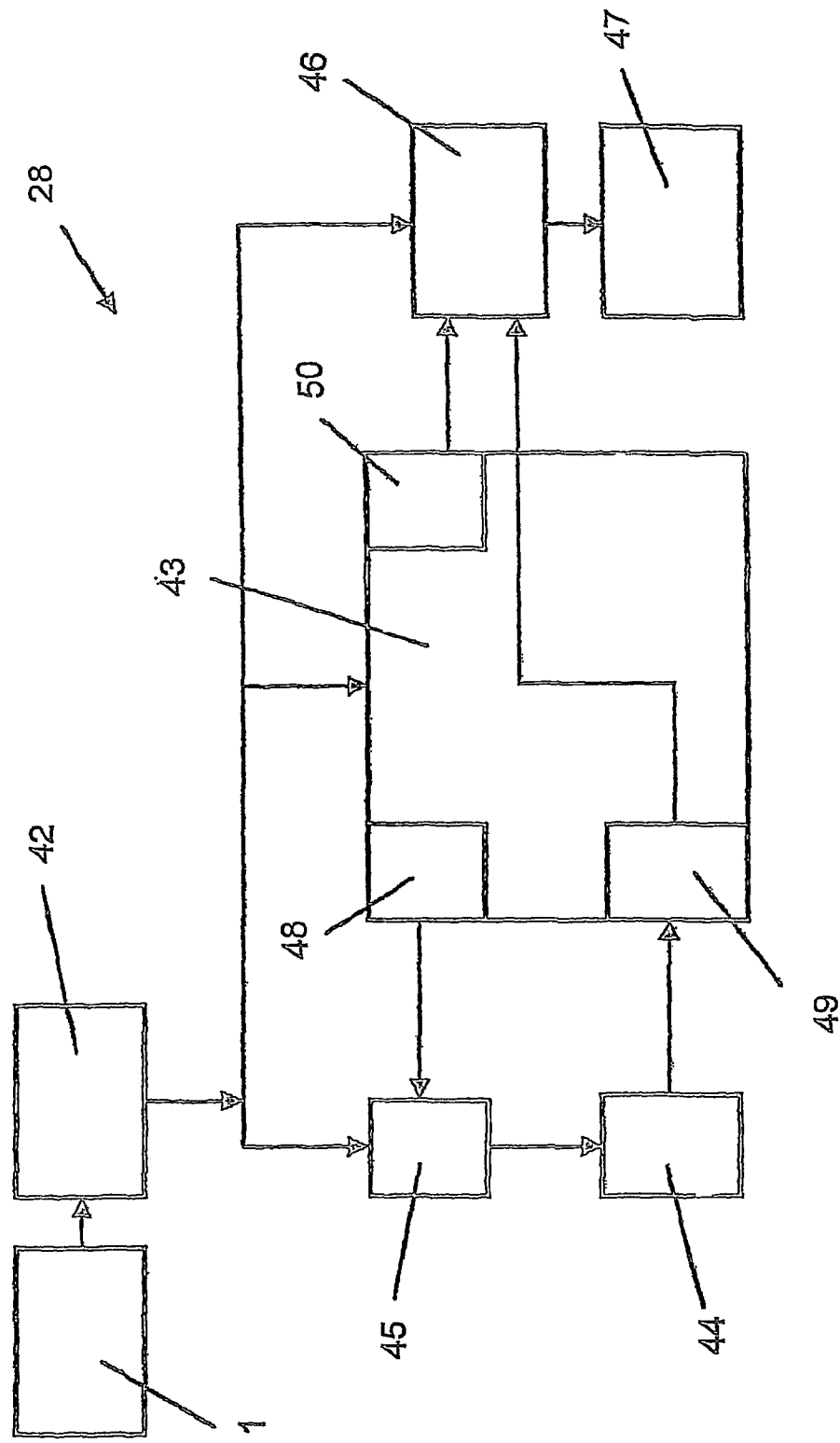
FIG. 3 shows an exemplary scheme of a monitoring device that can be used in a tyre according to the invention.

FIG. 1 shows an energy generation device 1 according to a first embodiment of the invention, comprising a tubular housing 10, a magnet 12, two electrical windings 11 and 13, and a force providing element 16.

The tubular housing 10 is advantageously made from magnetically inactive tribological material (i.e. with low friction coefficient) like, for example, Polyaryletherketone with added teflon (trade name Vitrex Peek 450FE20, produced by the firm Vitrex).

The magnet 12 is positioned inside the tubular housing 10. The magnet 12 has its magnetic axis positioned along the longitudinal axis X of the housing 10.

Advantageously, the magnet 12 is a permanent magnet. In the illustrated embodiment, the magnet 12 is cylindrical and has dimensions such as to allow its movement within the housing 10, along a direction parallel to the longitudinal axis X of the housing 10. The magnet 12 has a diameter slightly lower than that of the inner diameter of the tubular housing 10. Advantageously, the magnet 12 has a height no greater than half the height of the tubular housing 10. Advantageously, the magnet 12 has a height approximately equal to the height of each of the windings 11, 13.

For example, the magnet 12 can be made from a Neodymium-Iron-Boron material produced by Magneti Calamit—Cologno Monzese—Milano.

Advantageously, the magnet 12 is coated with low-friction material (for example Cadmium).

Preferably, the magnet 12 has a residual magnetic induction "$B_r$," greater than 1 Tesla.

The housing 10 can be equipped with openings (not illustrated) having a function such that the air flows during the movement of the magnet inside the housing 10. Preferably, the housing 10 has at least three longitudinal grooves, equally angularly spaced (in the case of three grooves, 120° apart). The air flow can also be ensured by keeping a clearance between the dimensions of the housing 10 and the magnet 12.

In an embodiment (not illustrated) the magnet 12 can consist of two cylindrical magnets spaced apart by a thin cylindrical foil of ferromagnetic material, for example soft iron, with the two magnets facing one another with poles of the same sign.

The two electrical windings 11, 13 are wound outside the tubular housing 10, respectively around a first half and a second half of the outer surface of the housing 10 so as to form turns on planes substantially perpendicular to the longitudinal axis X of the tubular housing.

The electrical windings 11 and 13 can be made from conductive material (for example, copper) that is insulated, preferably with enamelled insulation.

The electrical windings 11 and 13 are advantageously connected in counter-series (over the whole of the windings connected in this way the electric circuit thus has more or less the maximum variation of coupled flux for the various positions of the movable magnet).

The windings 11 and 13 can be of the same or different size along the axis X.

The windings 11 and 13 can have the same or a different number of turns.

Preferably, the two windings 11 and 13 are totally identical.

The electrical windings 11 and 13 are advantageously spaced apart by an annular spacer positioned on the outer surface of the tubular housing 10. In the illustrated embodiment, the spacer is positioned on a middle plane of the housing 10, perpendicular to the longitudinal axis X of the housing 10. Moreover, the spacer comprises two coaxial rings 14a, 14b, of which the inner one 14b is made from magnetically inactive material and the outer one 14a is made from ferromagnetic material. The two coaxial rings 14a, 14b can have an identical or different longitudinal and/or radial dimension, depending on the needs. The advantages of this embodiment with two coaxial rings 14a, 14b will be explained in detail later on with reference to FIGS. 8a and 8b.

For example, the ferromagnetic material is an SMC (Somaloy Prototyping Material) material, for example produced by the Swedish firm Hoganas.

For example, the magnetically inactive material is Vitrex Peek 450G, produced by Vitrex.

According to an embodiment (not illustrated) the spacer comprises a single ring of magnetically inactive material. The advantages of this embodiment with a single ring will be explained in detail later on with reference to FIGS. 8a and 8b.

Figure 4:
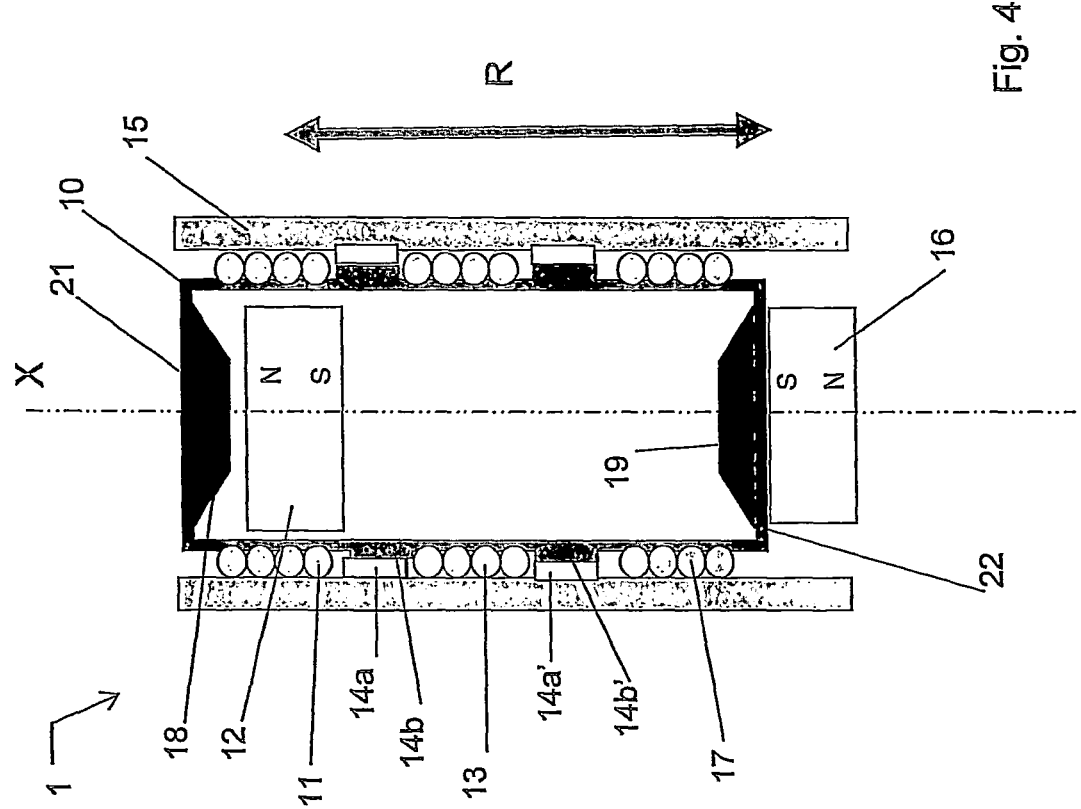
FIG. 4 schematically shows a longitudinal section view of a third embodiment of an energy generation device that can be used in a tyre according to the invention.

Although in the embodiment illustrated in FIG. 1 the device 1 comprises two electrical windings 11, 13, it can also comprise a single winding (even if this solution is less efficient) or more than two windings, separated by suitable spacers. For example, FIG. 4 shows an embodiment totally similar to that of FIG. 1, apart from the fact that the device 1 comprises three windings 11, 13, 17 separated by two pairs of spacer rings 14a, 14b and 14a', 14b'. Also in this case, the three windings 11, 13, 17 are advantageously connected in counter-series. The sizes along the axis X of the windings 11, 13 and 17 can be the same or different to each other.

In an embodiment (not shown), the device 1 comprises at least two pairs of windings each consisting of an inner winding and an outer winding coaxial to one another, in which the inner winding and the outer winding are configured so as to be selectively connected in series or in parallel (for example through a suitable switch), depending on the electric voltage to be outputted by the device 1. This solution can, for example, be advantageous when the device 1 is used to feed an external load having a minimum limit and a maximum limit of supply voltage. Indeed, the windings, normally connected in series so as to ensure a voltage above the minimum limit, can be switched into a connection in parallel when the voltage supplied in output from the device 1 exceeds the maximum limit (for example 5V).

The two ends of the housing 10 are closed by suitable covers 21, 22, on the bases of which two bumpers 18, 19 made from extremely elastic elastomeric mixture are rested (inside the housing 10). The two covers 21, 22 are preferably made from impact resistant material.

In the embodiments of FIGS. 1, 2 and 4, the two bumpers 18, 19 are, for example, frusto-conical in shape. In the embodiment of FIG. 1, the force providing element 16 comprises a cylindrical preload magnet having magnetic axis parallel to the longitudinal axis X of the housing 10.

The preload magnet 16 is positioned at one of the ends of the housing 10, on the outer surface of one of the two covers 21, 22 (for example, in a suitable seat formed on such an outer surface).

The preload magnet 16 is advantageously a permanent magnet. The magnet 12 and the preload magnet 16 have poles oriented so as to repel one another.

The preload magnet 16 and the magnet 12 can be made from the same material or from different materials. For example, the preload magnet 16 can also be made from a Neodymium-Iron-Boron material produced by Magneti Calamit—Cologno Monzese—Milan.

Preferably, the preload magnet 16 has a residual magnetic induction "$B_r$," greater than 1 Tesla.

Advantageously, the magnet 12 is greater in volume than the preload magnet 16. Preferably, the ratio between the volume of the magnet 12 and the volume of the preload magnet 16 is greater than 4.

The device 1 can also comprise an outer tubular element parallel and concentric to the housing 10, which surrounds the various elements described above of the device 1. Such an outer tubular element 15 has the advantage of avoiding dispersion of magnetic flux and of concentrating the same within the device 1. However, in order to contain the sizes of the device 1, such an element can be omitted.

Preferably, the outer tubular element 15 is made from ferromagnetic material and has a cylindrical shape. For example, the outer tubular element 15 is made from SMC (Somaloy Prototyping Material) material, produced by the Swedish firm Hoganas.

FIG. 2 shows an energy generating device 1 according to a second embodiment of the invention that is similar to that of FIG. 1 except for the fact that the force providing element comprises two cylindrical preload magnets 16' and 16" having magnetic axis parallel to the longitudinal axis X of the housing 10. The preload magnets 16' and 16" have poles oriented so as to both repel the magnet 12.

Advantageously, the magnet 12 is greater in volume than each preload magnet 16' and 16". Preferably, the ratio between the volume of the magnet 12 and the volume of each preload magnet 16' and 16" is greater than 4.

Preferably, in the case of two identical electrical windings like in the embodiment of FIG. 2, the two cylindrical preload magnets 16' and 16" are totally equal to each other.

In the various embodiments of FIGS. 1, 2 and 4, preferably the housing 10 has an inner diameter of between 3 and 6 mm and a thickness of between 0.3 and 1 mm; the magnet 12 has a height and diameter of between 3 and 6 mm; the spacer has a radial size of between 0.3 and 1.5 mm; the preload magnet(s) 16, 16', 16" have a diameter of between 2 and 4 mm and a height of between 1 and 3 mm; the outer tubular element 15 has an inner diameter of between 8 and 16 mm, a thickness of between 0.3 and 2 mm and a length of between 9 and 16 mm; the frusto-conical bumpers have a thickness of between 0.4 and 2 mm and a diameter smaller than the housing 10. Advantageously, the device occupies a volume of between 300 and 1500 mm$^3$.

The device 1 can be used to feed one or more devices installed on the wheel and/or on/in the tyre. Such devices can, for example, comprise sensor for detecting one or more operating parameters of the tyre itself (like, for example, pressure, temperature, local deformations, accelerations, speed, etc.). In addition or as an alternative to feeding detection systems, the device 1 can be used to supply the necessary power to actuators like, for example, pumps adapted to maintain the correct pressure inside the tyre. The device 1 can also be advantageously used to feed a transmitter adapted to send outside the tyre (typically to a control unit arranged on the vehicle) the information obtained by the sensors and to feed a microprocessor adapted to collect and process the signals coming from the sensors, before transmission. Optionally, the device 1 can also be used to feed a receiver adapted to receive possible information from the outside (for example, from a control unit arranged on the vehicle).

By suitably analysing the voltage signal that the device 1 generates in correspondence of each passage within the footprint, the device can also be used to extrapolate some data that can be detected from the variations of such a voltage signal. For example, the number of pulses generated in a certain time period due to the passage within the footprint corresponds to the number of revolutions of the tyre in such a time period and is indicative of the angular velocity of the tyre. Moreover, from the time length of each pulse it is possible to extrapolate information relative to the length of the footprint and/or to the load acting on the tyre, once the angular velocity and/or pressure are known.

Figure 5:
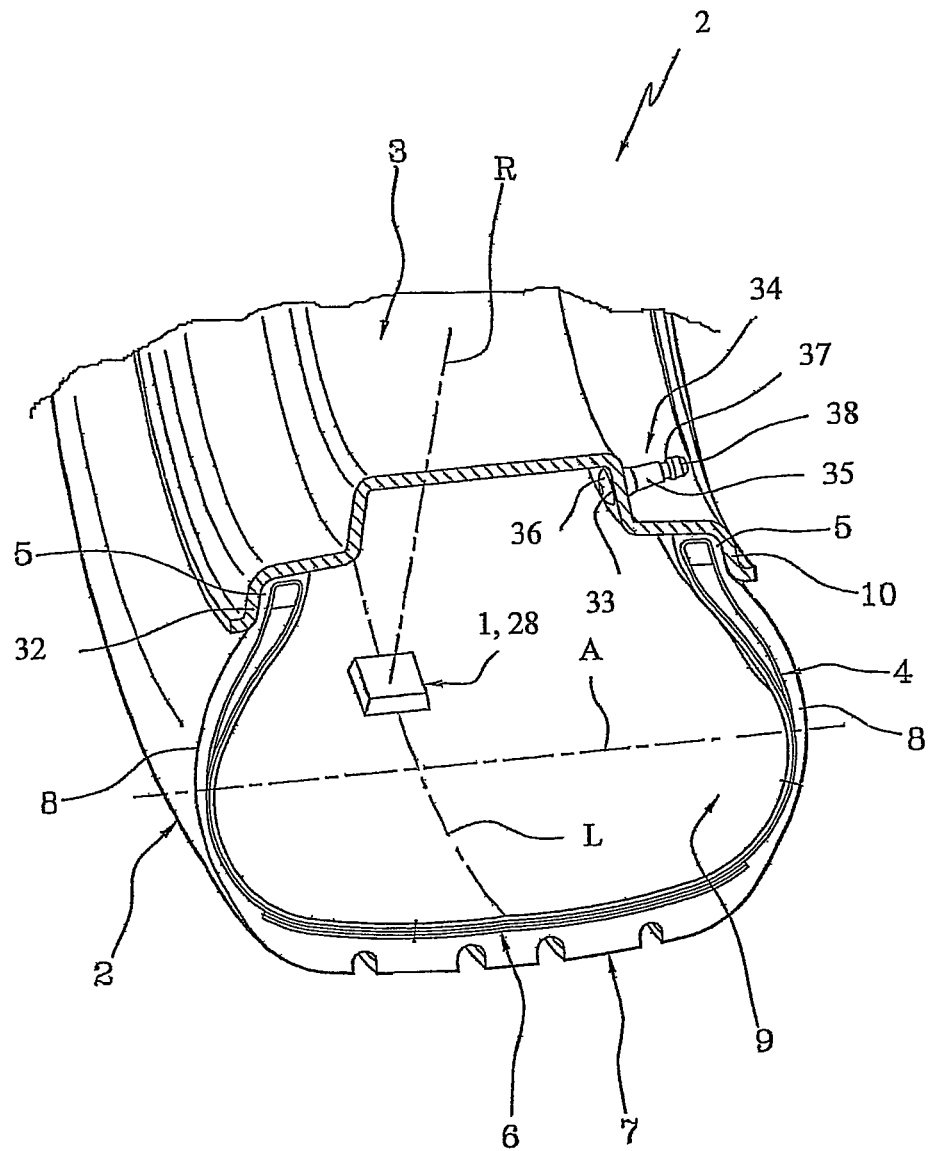
FIG. 5 schematically shows a tyre according to the invention.

FIG. 5 shows a tyre 2 according to the invention comprising a monitoring device 28 in turn comprising an energy generation device 1 according to the invention.

The tyre 2 is mounted on a rim 3. It can be mounted on any type of vehicle, like for example cars, goods transportation vehicles, such as lorries and vans, motor vehicles, etc.

The tyre 2 is preferably intended to be used on vehicles provided with electronic devices installed on board, adapted to cooperate and interact with the monitoring device 28.

The tyre 2 comprises a carcass structure 4 that has at least one carcasa ply, not illustrated in detail, configured according to a substantially toroidal configuration and engaged, through its opposite circumferential edges, with two annular anchoring structures (usually identified with the name "bead wires"), each of which is arranged in an area 5 usually identified with the name "bead". The two annular anchoring structures are spaced apart along a lateral direction "A" of the tyre 2, parallel to the geometric rolling axis of the tyre 2 itself.

A belt structure 6 comprising one or more belt strips is applied onto the carcass structure 4, in a circumferentially outer position.

The belt structure 6 is circumferentially juxtaposed by a tread band 7 on which longitudinal and transversal recesses are typically formed, arranged to define a desired tread pattern.

The tyre 2 also comprises a pair of so-called sidewalls 8 applied laterally on opposite side on the carcass structure 4.

The carcass structure 4 is typically coated on its inner walls by a sealing layer, or so-called "liner", comprising one or more layers of elastomeric material that is impermeable to air adapted to ensure the hermetic seal of the tyre itself.

The beads 5 of the tyre 2 are engaged on edges 32 of the rim 3.

The rim 3 is also provided with a hole 33 in which a valve 34 defined by a cylindrical body 35 is housed.

Inside the cylindrical body 35 a valve body, not illustrated, is mounted and such a cylindrical body 35 has a first end 36 facing the inside of the tyre 2 and a second end 37, opposite the first 36, projecting out from the rim 3 and provided with a closing cap 38.

The first end 36 of the valve 34 is defined by a flexible portion, for example made from rubber, engaged at the edges of the hole 33 formed in the rim 3.

Through the inflation pressure of the tyre 2, the beads 5 are pressed against the edges 32 of the rim 3 and ensure the seal of the tyre 2 on the rim 3 itself.

In the embodiment shown in FIG. 5, the monitoring device 28 is fixed to the liner of the tyre 2 through a suitable fixing element (not shown). Preferably, the monitoring device 28 is arranged substantially at the equatorial plane of the tyre 2.

The fixing element is advantageously adapted to shape itself to the deformations undergone by the structure of the tyre during rolling, in order to keep the attachment stable over time.

As an example FIG. 3 shows a block diagram of a monitoring device 28 comprising an energy generation device 1 according to the invention and a voltage preparation circuit 42, typically including for example a diode rectifier bridge (not shown), suitable for transforming an alternating current into a direct current. The voltage preparation circuit 42 also includes a condenser (not shown), adapted to store the electric voltage generated by the device 1. The voltage preparation circuit 42 can also comprise a voltage controller (not shown), which is adapted to verify that a voltage through the condenser is above a predetermined minimum (for example 2.7 Volt). The electric energy generated by the device 1 and stored in the voltage preparation circuit 42 is fed to a micro-controller 43, to a measuring device 44 (through the switch 45) and to a radio-frequency transmitter 46. The voltage preparation circuit 42 can also comprise an impedance adapter element (not shown) between the energy generation device 1 and the micro-controller 43, the measuring device 44 and the radio-frequency transmitter 46. The measuring device 44 comprises sensors adapted to measure physical magnitudes of interest (for example pressure, temperature, acceleration). The measuring device 44 also includes a control circuitry adapted to generate electric signals indicative of the measured physical magnitudes. The radio-frequency transmitter 46 is adapted to transmit, through an antenna 47, frames of information containing the data relative to the measured physical magnitudes, to a receiver (not shown) outside the tyre 2, typically situated on the vehicle on which the tyre is mounted. The micro-controller 43 typically comprises a CPU that controls the operation of the monitoring device 28. In the preferred embodiment shown in FIG. 3, the micro-controller 43, through a first timing/enabling circuit 48, enables the switch 45 to close the circuit towards the measuring device 44, in order to energise it so as to carry out the measurement of the characteristic parameter or parameters to be monitored. Furthermore, the micro-controller 43, through a second timing/enabling circuit 50, enables the frames transmission to the external receiver. Moreover, the micro-controller 43 collects the signals coming from the measuring device 44, converts them, through an analogue/digital converter 49, into a digital form, and processes them in order to extract the information to be sent outside the tyre 2 through the radio-frequency transmitter 46. The enabling of the closing of the switch 45, as well as the enabling of the frames transmission through the transmitter 46, can be carried out at predetermined time intervals. For example, the closing of the switch 45 and/or the transmission of data can be enabled when the voltage in the voltage preparation circuit 42 is above a predetermined threshold. The first and/or the second timing/enabling circuit 48, 50 can be made in any conventional way, as separate hardware circuits from the micro-controller 43, or as software items integrated in the memory of the micro-controller 43.

As explained better later on, the monitoring device 28 is preferably fixed onto the tyre 2 so that the housing 10 of the energy generation device 1 has its longitudinal axis X parallel to one from a radial direction, a longitudinal direction (also called tangential direction) or a lateral direction (also called axial direction) of the tyre (respectively indicated as "R", "L" and "A" in the figures).

The device 1 is able to generate electric energy through the transformation of the mechanical energy generated by the rolling of the tyre 2.

As the tyre 2 rotates on a rolling surface accelerations are generated that can be split into a radial acceleration, a lateral acceleration and a longitudinal acceleration that act on the device 1.

Figure 6A:
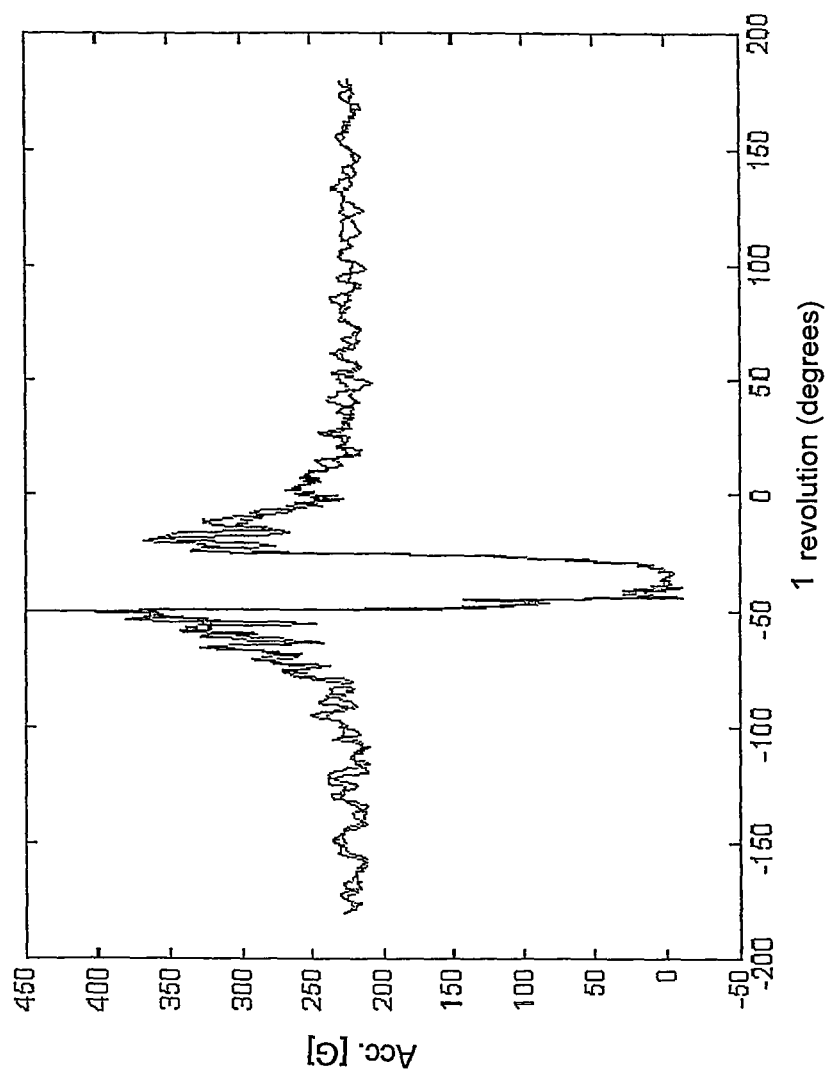
FIGS. 6a, 6b and 6c respectively show an example of radial, longitudinal and lateral acceleration generated during a tyre revolution.
Figure 6B:
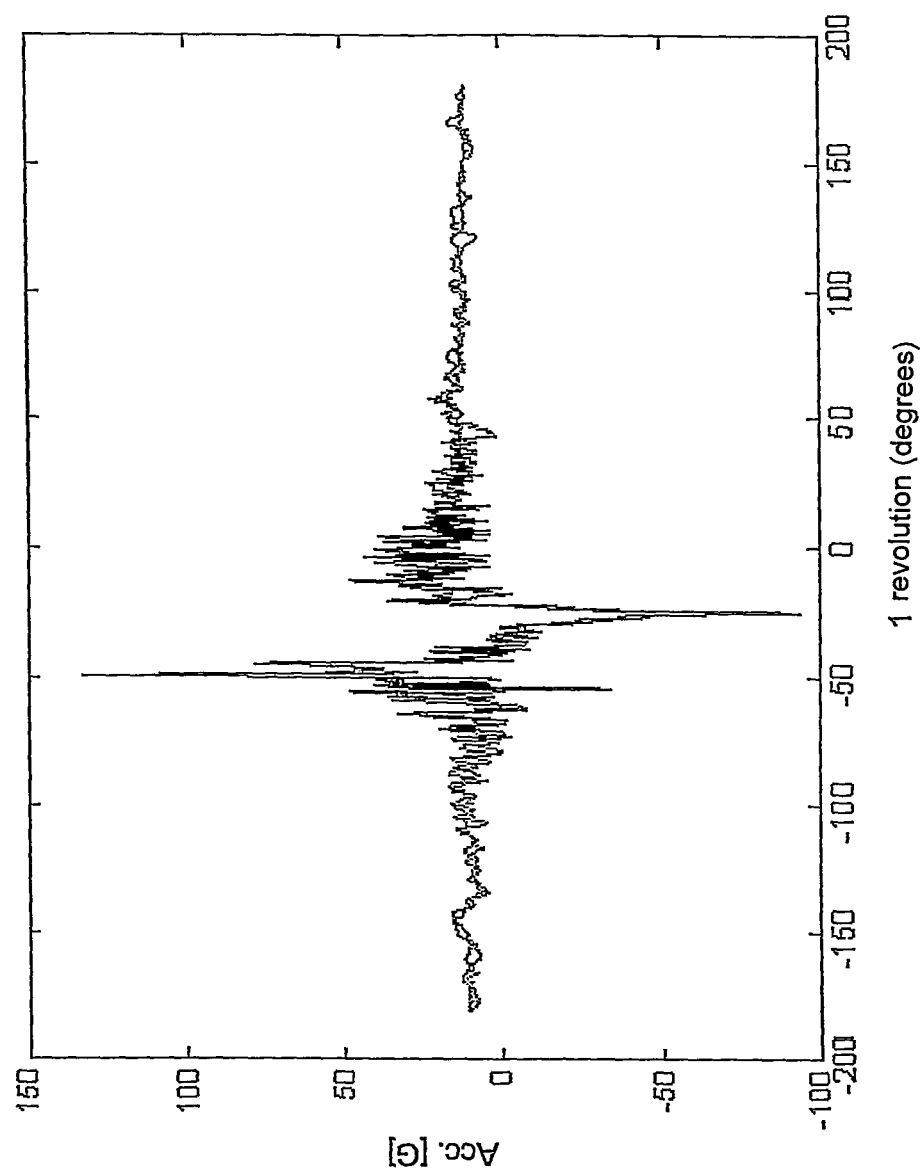
Figure 6C:
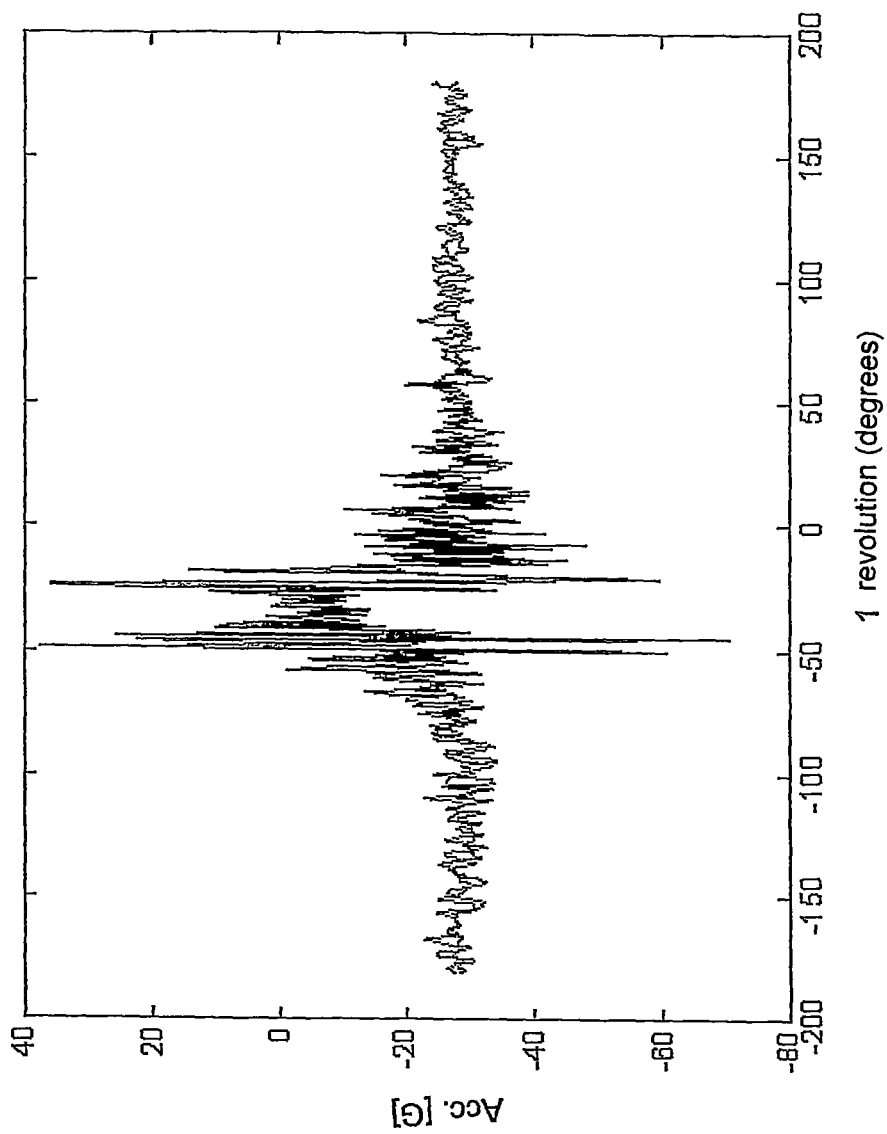

As an example, FIGS. 6a, 6b and 6c show three respective profiles of radial, longitudinal and lateral acceleration, versus time, to which the device 1 fixed to a tyre portion can be subjected, during a tyre revolution. The profiles of FIGS. 6a, 6b and 6c were obtained at constant tyre rolling speed, in a straight line and on a smooth rolling surface.

It can be seen that in all three cases, during a first fraction of a complete tyre revolution, during which the device 1 is out of a footprint of the tyre (i.e. when the tread area corresponding to the tyre portion on which the device 1 is fixed is not in contact with the ground), the acceleration is substantially constant, except for small oscillations visible in FIGS. 6a, 6b and 6c. In the case of radial acceleration, such a constant acceleration value depends on the rolling speed of the tyre. In the case of longitudinal acceleration, such a constant acceleration value is substantially equal to zero. In the case of lateral acceleration, such a constant acceleration value is typically slightly different from zero due to forces such as those generated due to the phenomenon usually identified by the name "ply-steer" and/or to effects given by a camber angle.

During a second fraction of a complete tyre revolution, during which the device 1 passes at a footprint of the tyre (i.e. when the tread area corresponding to the tyre portion on which the device 1 is fixed is in contact with the ground), the level of radial and lateral acceleration falls substantially to zero, as can be seen in the central portion of FIGS. 6a and 6c, after an initial increase due to a deformation that the tyre undergoes while passing from a circumferential configuration to a flat one, right at the start of the contact region between the tyre and the ground. The level of acceleration increases again when the device is once again outside of a footprint of the tyre. In case of longitudinal acceleration, during said second fraction of a complete tyre revolution, the level of acceleration firstly has a peak at the entry into the footprint, and then has another peak, of opposite sign, at the exit from the footprint.

Therefore during the rolling of the tyre, the radial, longitudinal and lateral accelerations to which the device 1 can be subjected undergo abrupt variations at every tyre revolution, every time the device passes within a footprint of the tyre, due to the rolling thereof.

According to the invention, such variations of acceleration are exploited to vary the position of the magnet 12 with respect to the windings 11, 13 (an optionally 23), along a direction of movement parallel to the longitudinal axis X of the housing 10.

For example, the device 1 according to the embodiment of FIG. 1 or 4 is particularly adapted to be fixed on the tyre with the longitudinal axis X of the housing 10 oriented according to the radial direction "R" of the tyre (so as to exploit variations of the radial acceleration) and so that the end of the housing 10 on which the preload magnet 16 is fixed faces, according to such a radial direction R, towards the outside of the tyre.

The device 1 according to the embodiment of FIG. 2, on the other hand, is particularly adapted to be fixed on the tyre with the longitudinal axis X of the housing 10 oriented according to the longitudinal direction "L" or according to the lateral direction "A" of the tyre, so as to exploit variations of the longitudinal or lateral acceleration.

We shall now refer to an energy generation device according to the embodiment of FIG. 1 or 4, fixed onto the tyre 2 with the longitudinal axis X parallel to the radial direction R of the tyre and with the preload magnet 16 facing, according to such a radial direction R, towards the outside of the tyre. During the aforementioned first fraction of complete tyre revolution, such a device is subjected to a radial acceleration directed towards the outside of the tyre, along the direction R, against the force generated by the magnetic preload 16 that, on the other hand, is directed towards the inside of the tyre. Such a radial acceleration can reach values of many hundreds of g at high speed (for example 500 g at 150 km/h). Based on this acceleration, the magnet 12 is pushed towards the outside of the tyre from a rest position to an operating position.

By rest position we mean the position of the magnet 12 when the tyre is stopped. When the tyre is stopped, the forces acting on the magnet 12 are the force exerted by the preload magnet 16 (which acts towards the inside of the tyre along the longitudinal axis X of the device 1) and the force of gravity. Considering that the component of the force of gravity along a direction parallel to the axis X changes according to the position of the device 1 with respect to the footprint of the tyre, the rest position of the magnet 12 can vary slightly depending on the aforementioned position of the device 1. In a preferred embodiment, the magnet 12 and the preload magnet 16 are advantageously configured (in terms of sizes, ratio between volumes and residual magnetic induction $B_r$) so that, at rest and in correspondence of the footprint, the magnet 12 is against the bumper 18 facing towards the inside of the tyre (i.e. at the opposite end to that at which the preload magnet 16 is fixed).

This enables to maximise the stroke of the magnet 12 within the device 1.

Depending on the value of the radial acceleration, i.e. the rotation speed of the tyre, the aforementioned operating position (taken up by the magnet 12 when the device 1 is outside of a footprint) can be against the bumper 19 facing towards the outside of the tyre or in an intermediate position between such position and the rest position. The greater the rotation speed, the farther the aforementioned operating position will be from the rest position, up to a maximum represented by the contact with the bumper 19 facing towards the outside of the tyre.

On the other hand, during the aforementioned second fraction of a complete tyre revolution, i.e. when the device passes in correspondence of a footprint, the magnet 12—pushed by the force exerted by the preload magnet 16—tends to suddenly go back towards the rest position, due to the fact that the radial acceleration suddenly decreases substantially to zero and no longer acts to keep the magnet 12 in the operating position against the force exerted by the preload magnet 16. Optionally, in correspondence of a footprint, the magnet can also make oscillations due to a bounce against the opposite end. The movement of the magnet 12 towards the rest position and the possible oscillations cause a variation of the magnetic flux coupled by the turns of the windings 11, 13, i.e. the generation of an electric voltage across the two windings 11, 13, due to the electromagnetic induction effect.

As soon as the device 1 is out of the footprint, the radial acceleration is restored by taking the magnet 12 back again towards an operating position. The movement of the magnet 12 towards the operating position causes a variation of the magnetic flux coupled to the turns of the windings 11, 13 and, therefore, the generation of an electric voltage across the two windings 11, 13.

The total amount of electric voltage generated in each movement of the magnet 12 depends, amongst other things, on the rolling speed of the tyre.

At low rolling speeds of the tyre (for example less than 50 km/h), the size of the movements of the magnet 12 each time the device passes in correspondence of the footprint of the tyre is relatively low so that a limited number of turns of the windings 11 and/or 13 is affected by the variation of magnetic flux. Moreover, in a given time period, the number of passages of the device 1 in correspondence of the footprint is relatively low. However, at each passage, the device stays in correspondence of the footprint for a longer time, so that in correspondence of the footprint the magnet 12 can undergo a greater number of oscillations.

At medium rolling speeds of the tyre (for example between 50 and 100 km/h) the size of the movements of the magnet 12 each time the device passes in correspondence of the footprint of the tyre is higher so that a greater number of turns of the windings 11 and/or 13 is affected by the variation of magnetic flux. Moreover, in a given time period, the number of passages of the device 1 in correspondence of the footprint is higher. However, at each revolution, the device stays in correspondence of the footprint for a shorter time, so that the magnet 12 can undergo a significantly smaller number of oscillations.

At high rolling speeds of the tyre (for example over 100 km/h), the operating position out of the footprint will correspond to the bottom of the housing 10, against the bumper 19 towards the outside of the tyre. Moreover, in a given time period, the number of passages of the device 1 in correspondence of the footprint is very high. However, the frequency of such passages can become so high that it can happen that in some particular situations the magnet 12 stops practically in the operating position out of the footprint and just oscillates in the vicinity of said operating position.

The behaviour of the magnet 12 has been explained up to now with reference to a so-called "first harmonic" contribution of the acceleration to which the device 1 is subjected, i.e. a contribution that occurs once per revolution of the tyre, each time the device 1 passes in correspondence of a footprint. The frequency associated with such a contribution can vary within a low frequency range from 0 Hz to a few tens of Hz, based on the rotation speed of the tyre (for example about 20-25 Hz, for a car tyre at a speed of about 150 km/h). Such a frequency corresponds to the number of times per second that the device 1 passes in correspondence of the footprint. Thanks to this "first harmonic" contribution, it is possible to obtain a "pulsed" generation of electric charge, as a result of the "pulsed" oscillating behaviour of the magnet 12, with a "pulse frequency" dependent on the rotation speed of the tyre.

However, the actual acceleration to which the device 1 is subjected in the radial direction has also components in higher frequency ranges than the "first harmonic" ones mentioned above, as can be seen from the presence of the oscillations in the radial acceleration profile shown in FIG. 6a. These "high" frequency components are due to higher order harmonic contributions, i.e. to events that occur more than once per revolution of the tyre.

For example, a higher order harmonic contribution can be due to the interaction with the road of the blocks forming the tread of the tyre. Other higher order harmonic contributions can come from vibrational modes of the entire structure of the tyre due to the transmission of the deformations, to which the tyre is subjected under the footprint, to portions of the tyre out of the footprint. Further higher-order contributions can be caused by the interaction with the road of smaller tread portions, which can depend on the granularity of the ground (for example asphalt) on which the tyre rolls.

Figure 7B:
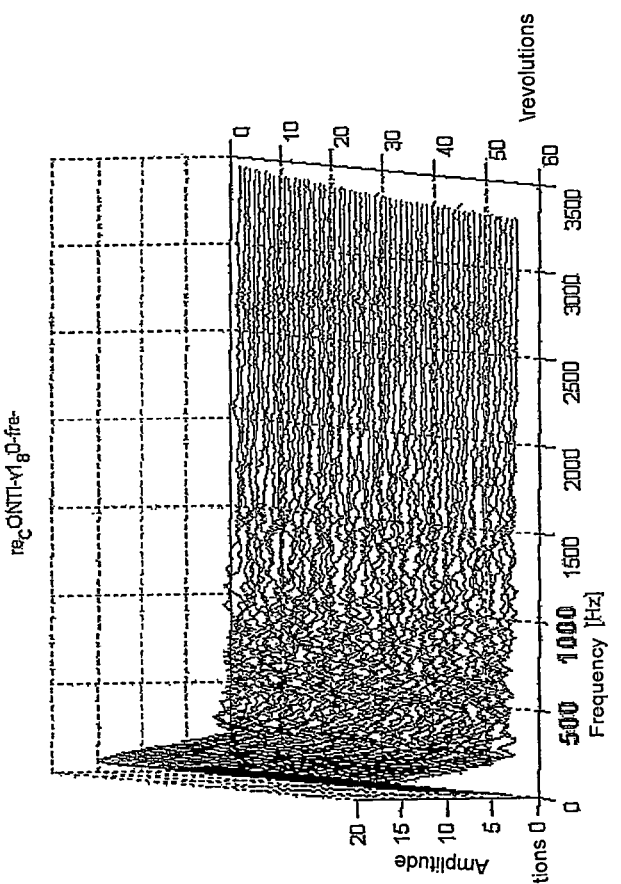
FIGS. 7a and 7b show the frequency contributions of radial acceleration signals generated during a plurality of revolutions of a tyre (indicated in the ordinate on the right) on a rough rolling surface (FIG. 7a) and on a smooth rolling surface (FIG. 7b)
Figure 7A:
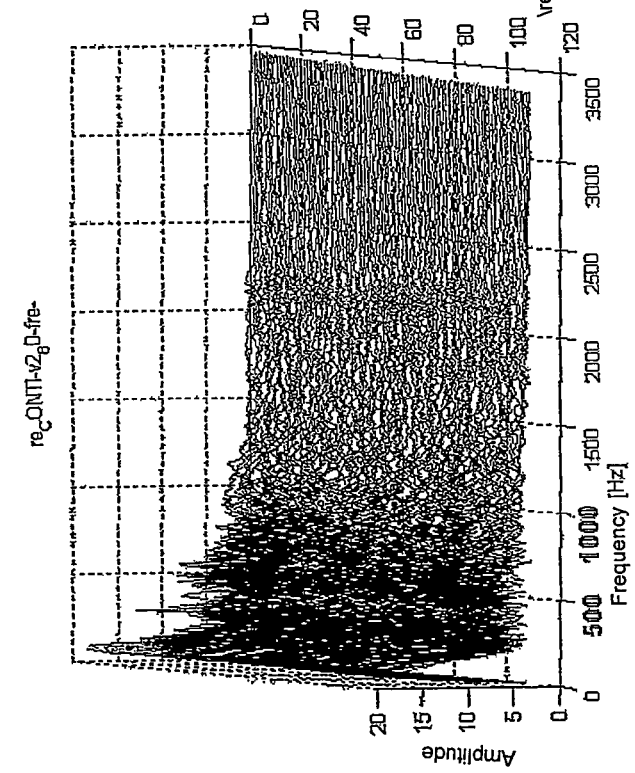

As an example, FIGS. 7a and 7b show the frequency contributions of radial acceleration signals obtained through an accelerometer attached to the liner of a tyre P7 205/55 R16 that rolls at a rotation speed of 100 km/h for many revolutions on a rough rolling surface (FIG. 7a) and on a smooth rolling surface (FIG. 7b). In particular, FIGS. 7a and 7b show different curves, each obtained in a single revolution. The abscissa shows the frequency (in Hz) of the different acceleration components, whereas the ordinate on the left shows the degree of acceleration (expressed in g). As can be seen, the various curves have a peak at the aforementioned "first harmonic" frequency and higher-order contributions of a certain magnitude up to about 800 Hz in the case of a rough surface and up to about 200 Hz in the case of a smooth surface.

As better explained hereafter, the aforementioned higher order frequency contributions in the radial acceleration signal can bring other contributions to the movement of the magnet 12, in addition to those brought by the aforementioned "first harmonic" contribution. For example, such contributions can be exploited to make the magnet 12 oscillate around the operating positions taken up when the device 1 is out of the footprint and, optionally, also when the device 1 is in correspondence of the footprint.

As shown as an example in FIG. 9, in the device 1 according to the embodiment of FIG. 1 the magneto-elastic force F (i.e. the repulsive force along the axis X of the housing 10) exerted by the preload magnet 16 on the magnet 12 increases as the magnet 12 approaches the preload magnet 16. In the reference system considered in FIG. 9, x=0 represents a position of the magnet 12 in the middle of the housing 10, x<0 represents positions of the magnet 12 towards the outside of the tyre (approaching the preload magnet 16) and x>0 represents positions of the magnet 12 towards the inside of the tyre (away from the preload magnet 16). Moreover, the force directed along the axis X towards the inside of the tyre is considered to be positive and that directed along the axis X towards the outside of the tyre is considered to be negative.

The Applicant has observed that the magnet 12 and the preload magnet 16 form a "magnetic spring" having a stiffness coefficient K (represented by the tangent to the curve of the aforementioned magneto-elastic force F) and a own frequency that depends on such a coefficient K and on the mass m of the movable magnet 12 according to the relationship $(K/m)^{1/2}$. The Applicant has also observed that the stiffness coefficient K, together with the own frequency, increase as the magnet 12 approaches the preload magnet 16 (in FIG. 9 as the height x becomes increasingly negative).

The magnet 12 and the preload magnet 16 can therefore be advantageously sized so as to best exploit, at a rolling speed of interest, the aforementioned higher order frequency contributions of the radial acceleration to make the magnet 12 oscillate around the operating position taken up when the device 1 is out of the footprint of the tyre. In particular, the magnet 12 and the preload magnet 16 can be advantageously sized so that the aforementioned magneto-elastic force F is such that, when the magnet 12 is in a position that corresponds to an operating position taken up by it out of the footprint, at the speed of interest, the magnetic spring has a own frequency that is comparable with the frequency of the maximum peak (for example about 200 Hz) of the aforementioned higher-order contributions of the radial acceleration.

For example, the Applicant has found that this can be advantageous to optimise the generation of electric energy at low rolling speeds (e.g. 20-40 km/h) of the tyre (i.e. when the radial acceleration developed by the rotation of the tyre is not strong enough to substantially cancel out all of the other frequency components) to make the magnet 12 oscillate around the aforementioned operating position. Such oscillations, due to the aforementioned higher-order contributions, can be very advantageous for the generation of electric energy at low-medium speed. On the other hand, at a high speed, the radial acceleration developed becomes so strong, with respect to the other components forming the radial acceleration, that any oscillation of the magnet 12 is practically prevented. In such a situation, the electric voltage generated is, however, significant thanks to the fact that the number of times, per time unit, that the device 1 passes in correspondence of a footprint of the tyre is very high. Moreover, the intensity of each pulse can be high because the excursion of the magnet 12 can correspond to most or all of the extension of the housing 10.

The Applicant observes that, considering that the aforementioned operating position taken up by the magnet 12 out of the footprint approaches the preload magnet 16 as the rolling speed of the tyre increases and that the frequency of the peak of the higher-order contributions of the radial acceleration also increases as the rolling speed of the tyre increases, the magnet 12 and the preload magnet 16 can form an "adaptive resonance system", i.e. a resonant system having a own resonance frequency that increases, as the speed increases, together with the increase of the frequency of the peak of higher-order contributions of the radial acceleration.

Therefore, once the magnet 12 and the magnetic preload 16 have been sized so as to adapt, at a certain speed of interest, the resonance frequency of the device 1 to the frequency of the peak of higher-order contributions of the radial acceleration, the device 1 can keep such an adaptation even within a certain speed range around the aforementioned speed of interest.

The Applicant has also observed that the electric voltage e(t) generated across the two windings 11, 13 connected in counter-series depends on the variation of the total flux λ coupled by such windings over the time, according to the following relationship:

$e(t) = -d\lambda/dt = -(d\lambda/dx)*(dx/dt)$ with $\lambda = (\Phi1 - \Phi2)*N$ and, therefore, $e(t) = -N(d\Phi1/dx - d\Phi2/dx)*(dx/dt)$ where dx represents the movement of the movable magnet 12 at a given time dt along the longitudinal axis X of the housing 10, N represents the total number of turns of every winding and Φ1 and Φ2 represent the average flux coupled into a turn of the winding 11 and of the winding 13, respectively.

The aforementioned relationship shows that the electric voltage e(t) generated across the two windings 11, 13 connected in counter-series increases as the relative speed of the magnet 12 (dx/dt) with respect to the housing 10 increases and as the gradient of the coupled flux with respect to the position of the magnet 12 (dλ/dx) increases.

Figure 10:
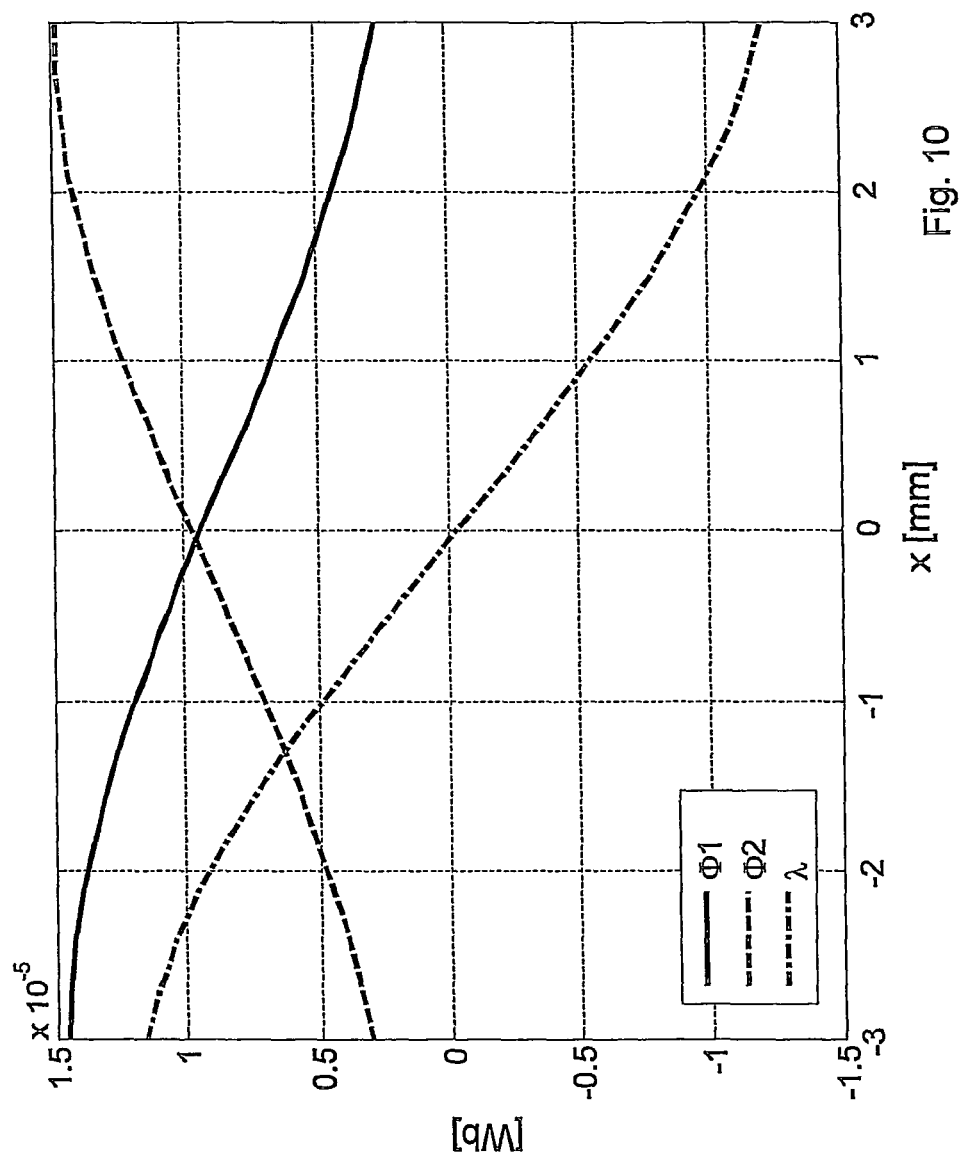
FIG. 10 shows the pattern of the average coupled flux $\Phi 1$ and $\Phi 2$ versus the position x of a movable magnet in an energy generation device of the type of FIG. 1, for two turns situated in symmetrical position with respect to the centre of the housing of the device, and the pattern of the total coupled flux $\lambda$ versus the position x of the movable magnet.

As an example, FIG. 10 qualitatively shows the pattern of Φ1 and Φ2 versus the position x of the magnet 12 in a device of the type of FIG. 1, for two turns of the windings 11 and 13 situated in a symmetrical position with respect to the centre of the housing 10 (x=0). It should be observed that in FIG. 10, x=0 represents a position of the magnet 12 in the middle of the housing 10, x<0 represents positions of the magnet 12 towards the outside of the tyre (approaching the preload magnet 16) and x>0 represents positions of the magnet 12 towards the inside of the tyre (away from the preload magnet 16).

FIG. 10 also shows the pattern of the total coupled flux λ versus the position x of the magnet 12 (curve dλ/dx). As can be seen from FIG. 10, the total coupled flux λ has a symmetrical pattern with respect to the central position (x=0) of the magnet 12, wherein the curve dλ/dx has maximum slope. Oscillations of the magnet around such a position can therefore maximise the electric voltage e(t) generated across the two windings 11, 13.

In general, the Applicant has found that the electric voltage e(t) generated across the two windings 11, 13 connected in counter-series can be maximised by configuring the device 1, and in particular the magnet 12 and the preload magnet 16, so that the operating position taken up by the magnet 12 out of the footprint, at a certain speed of interest, corresponds to a position in which the curve dλ/dx has maximum gradient (x=0 in the case of FIGS. 1 and 10).

In a preferred embodiment, the magnet 12 and the preload magnet 16 are therefore advantageously configured (in terms of dimensions, ratio between volumes and residual magnetic induction $B_r$) so that, at a certain rolling speed of interest of the tyre, every time the device is out of a footprint, the movable magnet is (except for oscillations) in an operating position in which the curve dλ/dx has a maximum gradient. Moreover, the magnet 12 and the preload magnet 16 are advantageously also configured so that, in the aforementioned operating position of the movable magnet, the device has a own resonance frequency comparable with the frequency of the peak of the higher-order contributions of the forces acting on the device along said axis X. The Applicant has found that the magnet 12 and the preload magnet 16 can be configured so as to satisfy both conditions.

The Applicant has also found that the absolute value of the maximum slope of the curve dλ/dx can be increased by using, instead of a spacer comprising a single ring of magnetically inactive material, a spacer like the one shown in FIGS. 1, 2 and 4 having two rings 14a, 14b, the inner one of which 14b is made from magnetically inactive material and the outer one of which 14a is made from ferromagnetic material. The Applicant has also found that the absolute value of the maximum slope of the aforementioned curve can be varied by varying the radial size of the two coaxial rings 14a, 14b.

In this connection, the Applicant observes that while, on the one hand, the ring 14a of ferromagnetic material increases the electric voltage e(t) generated across the two windings 11, 13 due to movements of the magnet 12 around the position in which the curve dλ/dx has maximum slope, on the other hand it exerts an attraction force on the magnet 12 so that a greater force is required to move the magnet 12 from such a position.

The presence of the ring 14a of ferromagnetic material can therefore be more or less advantageous according to whether it is wished to maximise the electric voltage e(t) generated across the two windings 11, 13 connected in counter-series at medium-high rolling speeds or whether it is wished to ensure significant electric power values (for example at least equal to 1-2 mW) even at low rolling speeds. Indeed, at low rolling speeds, the attraction force exerted by the ring 14a on the magnet 12 can limit the size of the movements of the magnet 12 around the aforementioned position in which the curve dλ/dx has maximum slope.

Figure 8B:
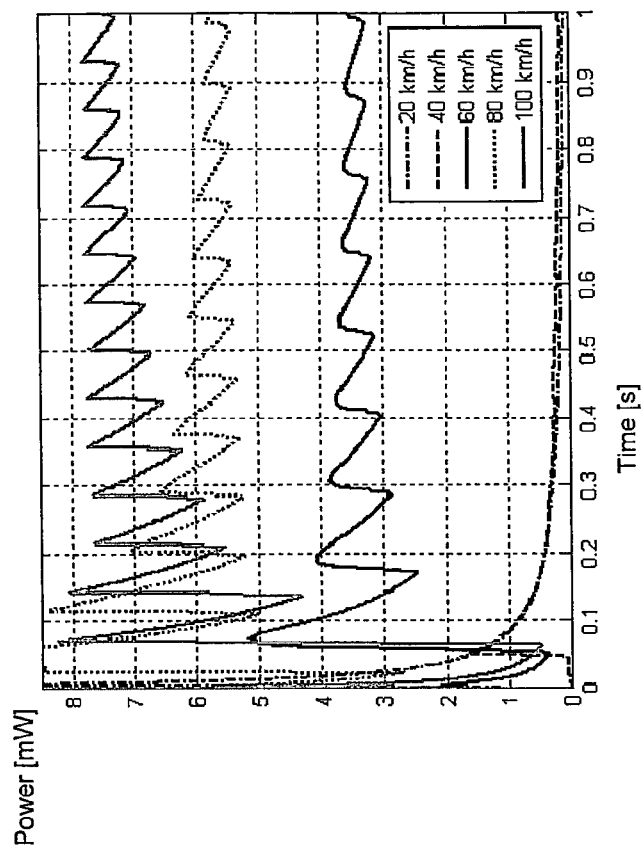
FIGS. 8a and 8b show examples of power versus time that can be obtained at different rolling speeds of a tyre using a device of the type of FIG. 1 with a single spacer ring made from magnetically inactive material (FIG. 8a) and with an inner ring made from magnetically inactive material and an outer ring made from ferromagnetic material (FIG. 8b)
Figure 8A:
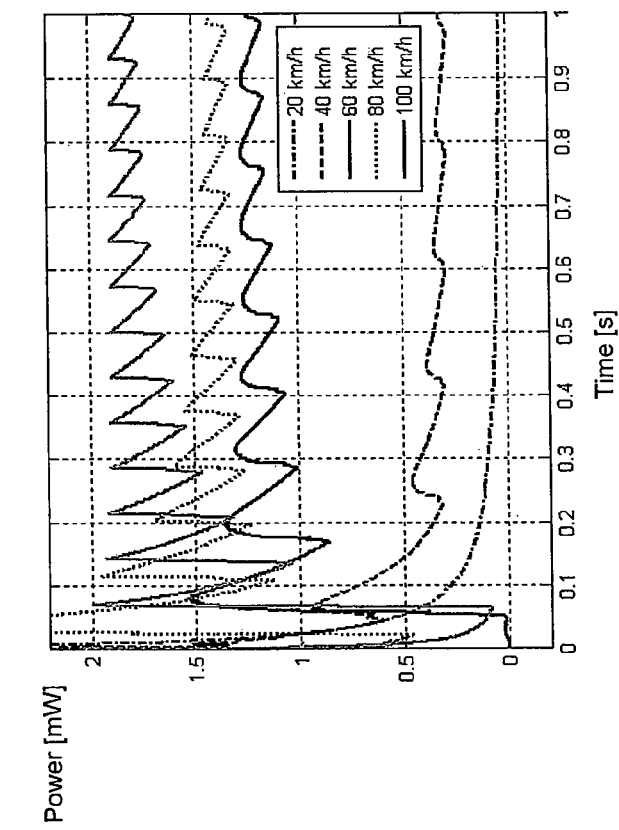

As an example, FIGS. 8a and 8b show the power (expressed in mW) versus time (expressed in seconds) obtained through simulations carried out by the Applicant at different rolling speeds of the tyre using two devices that are totally identical, made according to the embodiment of FIG. 1, except for the fact that one (the results of which are shown in FIG. 8a) had a single spacer ring made from magnetically inactive material whereas the other one (the results of which are shown in FIG. 8b) had an inner ring of magnetically inactive material and an outer ring of ferromagnetic material, each 2 mm in thickness. As can be seen from such results, for the same geometry of the device (apart from the presence of the spacer ring made from ferromagnetic material) the performance of the device in terms of power generated is about 3-4 times greater in the case of use of the spacer ring made from ferromagnetic material. FIGS. 8a and 8b represent, from the bottom upwards, power values obtained at 20, 40, 60, 80 and 100 km/h.

Similar considerations to those made above in relation to the embodiments of FIGS. 1 and 4 also apply to the case of the embodiment of FIG. 2 in which, however, the energy generating device 1 is fixed onto the tyre 2 with the longitudinal axis X parallel to the longitudinal direction L or lateral direction A of the tyre and, instead of the variations of radial acceleration, the variations of longitudinal or lateral acceleration that occur every time the device 1 passes in correspondence of a tyre footprint are exploited.

In particular, in the case of longitudinal acceleration, during the aforementioned first fraction of a complete tyre revolution, during which the device 1 is out of a footprint of the tyre, the device 1 is subjected to a substantially zero longitudinal acceleration except for the oscillations visible in FIG. 6b, linked to higher order frequency contributions. During the aforementioned first fraction of a complete tyre revolution the magnet therefore remains in an operating position almost corresponding to the rest position (when the tyre is stopped), apart from oscillations due to the aforementioned higher order components of the longitudinal acceleration. Such oscillations cause a variation of the magnetic flux coupled by the turns of the windings 11, 13, i.e. a generation of electric voltage across the two windings 11, 13. In a preferred embodiment, the magnet 12 and the preload magnets 16' and 16" are advantageously configured so that the aforementioned operating position corresponds to a position in which the curve dλ/dx has maximum slope (i.e., in the case of FIG. 2, in the middle of the housing 10 with x=0). As explained above, this makes it possible to maximise the generation of electric voltage e(t) generated across the two windings 11, 13. Moreover, such generation of electric voltage can be further optimised by configuring the device 1 (and in particular the magnet 12 and the two preload magnets 16' and 16") so that, when the magnet 12 is in the aforementioned operating position (almost corresponding to the rest position), the magnetic spring has a own frequency comparable with the frequency (for example of about 200 Hz) of the peak of the aforementioned higher order frequency contributions of the longitudinal acceleration.

Figure 11:
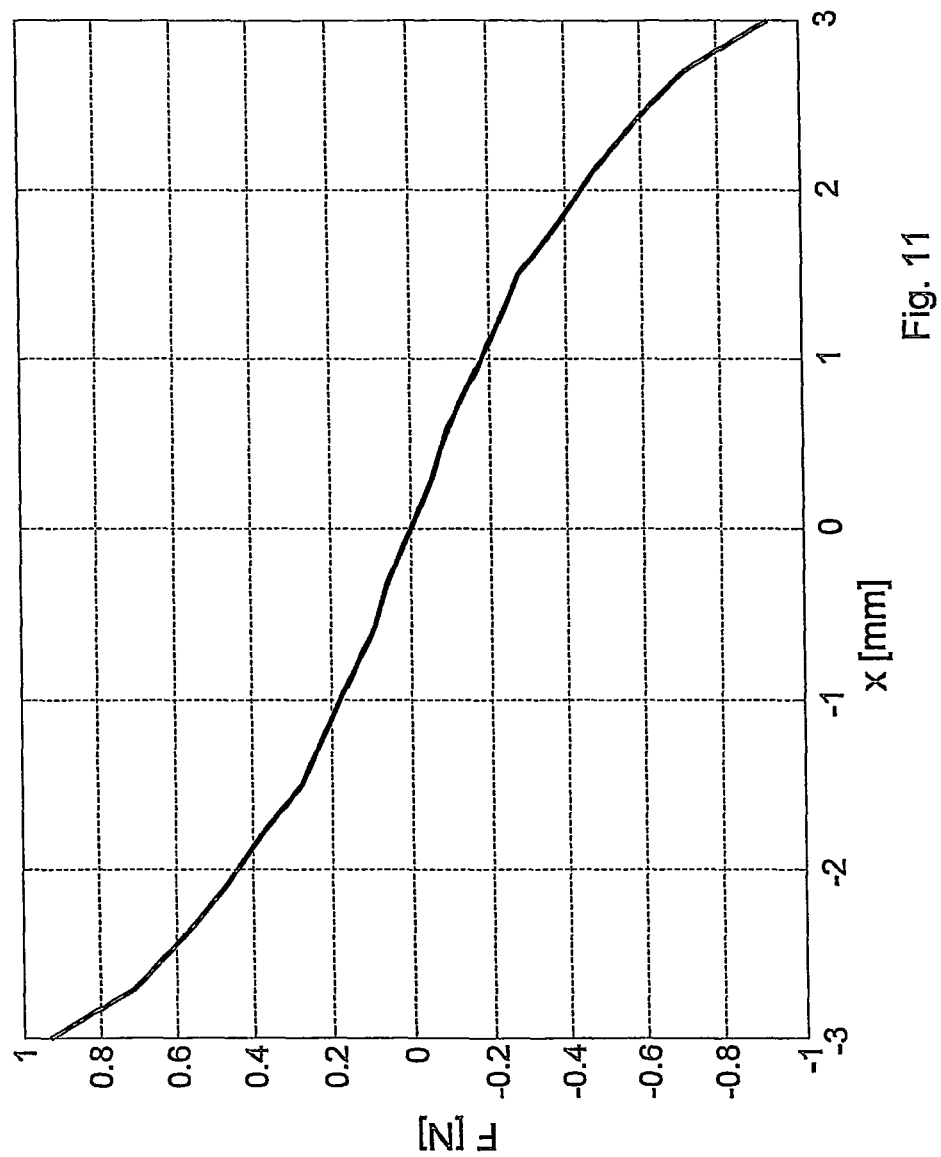
FIG. 11 shows an example of magneto-elastic force exerted in an energy generation device according to the embodiment of FIG. 2 by two preload magnets on a movable magnet, versus the position x of the movable magnet along the longitudinal axis of the device.

In this connection, FIG. 11 shows the magneto-elastic force F (i.e. the repulsive force along the axis X of the housing 10) exerted by the two preload magnets 16' and 16" on the magnet 12 versus the position x of the magnet 12 along the axis X of the device of FIG. 2. In the reference system considered in FIG. 11, x=0 represents a position of the magnet 12 in the middle of the housing 10, x<0 represents positions of the magnet 12 approaching the preload magnet 16' and x>0 represents positions of the magnet 12 approaching the preload magnet 16".

Unlike the magneto-elastic force represented in FIG. 9 for a device according to the embodiment of FIG. 1, the force of FIG. 11 has a symmetrical pattern with respect to x=0 and a stiffness coefficient K (represented by the tangent to the curve) almost constant around x=0.

During the aforementioned second fraction of a complete tyre revolution, i.e., when the device is in correspondence of a footprint of the tyre, the magnet 12 is moved away from the aforementioned operating position, firstly in one direction and then in an opposite direction, due to the fact that the longitudinal acceleration undergoes firstly an abrupt decrease and then an abrupt increase (see FIG. 6b). As soon as the device 1 is out of the footprint of the tyre, the substantially zero value of the longitudinal acceleration is restored and the magnet 12 will oscillate around the aforementioned operating position until it stops due to friction or until, due to the rolling of the tyre, the device is back again in correspondence of a footprint.

In the case of lateral acceleration, similar considerations to those made above for the longitudinal case apply.

It should be observed that although in the embodiments described above reference has been made to a force providing element comprising a preload magnet 16 (embodiments of FIGS. 1 and 4) or two preload magnets 16' and 16" (embodiment of FIG. 2), the present invention also applies to the case in which the force providing element comprises one or two elastic springs (for example springs with variable elastic constant like helicoidal or "cup" springs) or one or two elements made from elastic material (such as material with open cells). The Applicant observes that the present invention in its various aspects enables to generate electric energy in a tyre through a solution that allows to obtain desired energy values by playing on a plurality of design parameters like, for example, the number of turns of the windings, the number of windings, the diameter of the wire that constitutes the winding, the thickness of the ferromagnetic spacer ring, the size and/or the material of the magnet 12, the size and/or material of the magnet or of the preload magnets 16, 16', 16", the size ratio between the movable magnet and the preload magnets, the relative distance between the magnets and the windings. Each time, according to the applications, it is possible to play upon such parameters to obtain the desired performance.

The Applicant has also found that the present invention in its various aspects makes enables to generate high average power values (for example of at least 1 mW at 30-40 km/h) with a device that is strong (that is able, for example, to withstand speeds of over 280 km/h), compact, small in size and with a high ratio between average power generated and volume occupied by the device.

Moreover, the Applicant has found that the present invention in its various aspects enables to generate electric voltage through a device having relatively low output impedance (for example 50-100 ohm), which can be easily matched to the input impedance of external load circuits (such as the measuring device 44 and the radio-frequency transmitter 46 of FIG. 3).

As an example, the Applicant simulated the behaviour of a device 1 according to the embodiment of FIG. 1, mounted on the liner of a tyre with the longitudinal axis X of the device oriented according to the radial direction "R" of the tyre and the end of the housing 10 with the preload magnet 16 facing, according to such a radial direction R, towards the outside of the tyre.

The device used for the simulations had: the housing 10 with an inner diameter of 5 mm and an outer diameter of 6 mm; the movable magnet 12 with a height of 5 mm and a diameter of 5 mm; the two coaxial rings 14a, 14b with a total radial size of 1 mm; the preload magnet 16 with a diameter of 3 mm and a height of 1 mm; the outer tubular element 15 with an inner diameter of 10 mm, an outer diameter of 11 mm and a length of 14.40 mm; the frusto-conical bumpers 18, 19 with a height of 0.8 mm, the largest diameter of 4.9 mm and the shortest diameter of 4.8 mm; the windings 11, 13 made from copper wire with a diameter of 0.1 mm, 709 turns per winding and resistance per winding of 40 Ohm; and a total volume occupied of 1.3 cm$^3$.

The results obtained with such simulations are shown in FIGS. 12-18.

Figure 12:
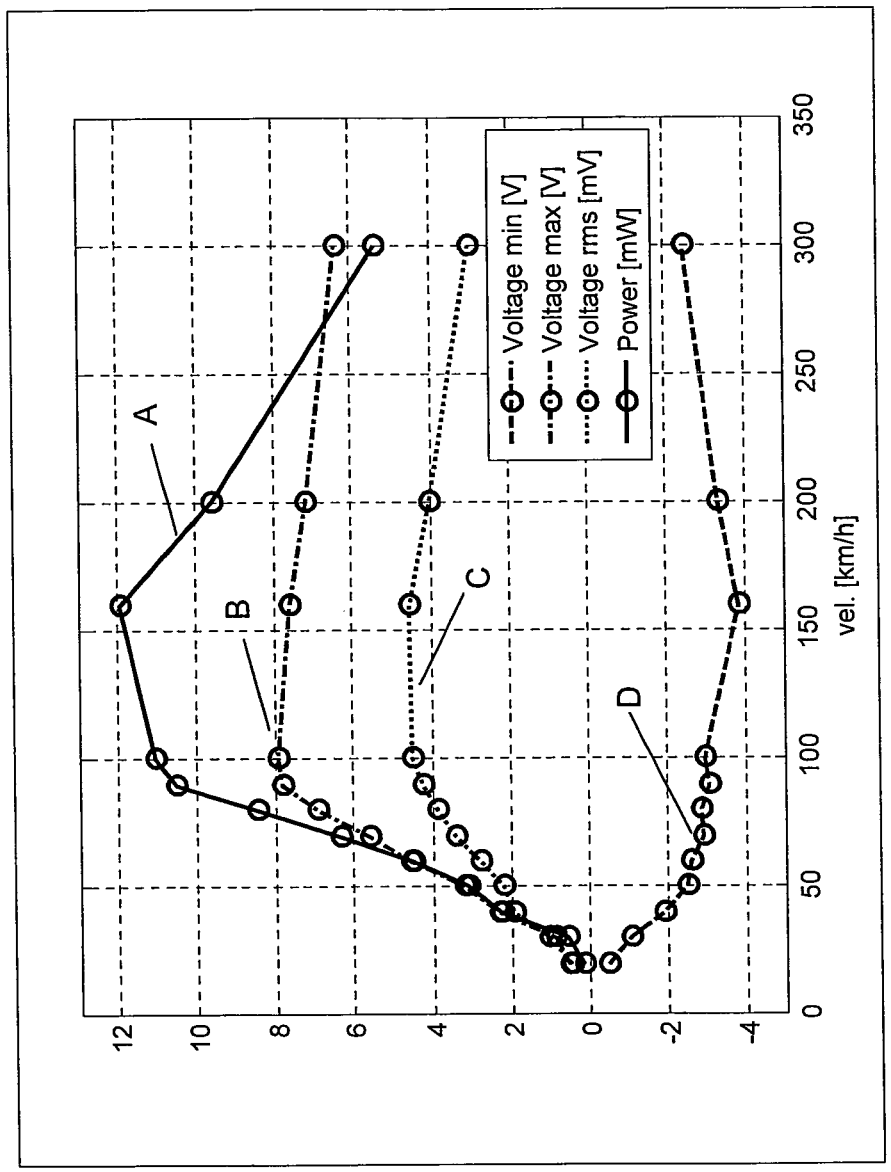
FIG. 12 shows average power values (curve A), maximum voltage (curve B), average quadratic value of the voltage (curve C) and minimum voltage (curve D) versus the rolling speed of a tyre, obtained through simulations carried out by the Applicant on the behaviour of an energy generation device according to the embodiment of FIG. 1.

In particular, FIG. 12 shows values of average power (curve A), maximum voltage (curve B), average quadratic value of the voltage (curve C) and minimum voltage (curve D) obtained versus the rolling speed of the tyre on a rolling road surface, with the two windings 11, 13 connected to a matched load having a certain equivalent resistance.

Figure 13:
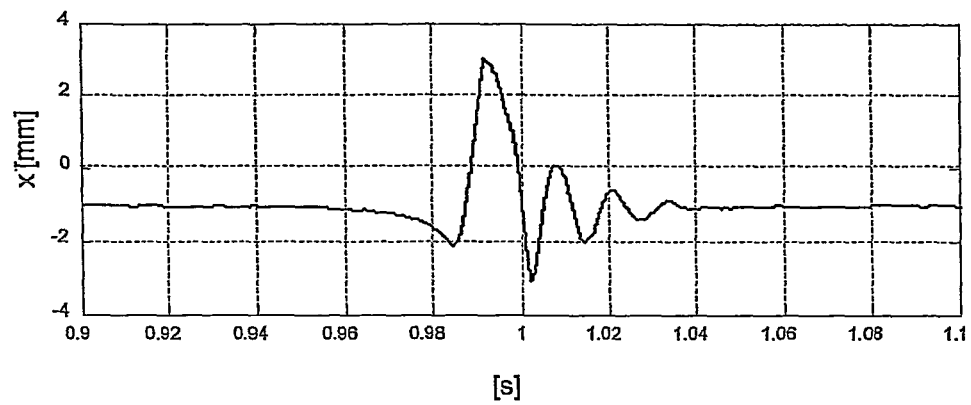
FIG. 13 and FIG. 14 show the position x taken up by the movable magnet along the axis X of the simulated energy generation device and the voltage V generated by such a device in one complete tyre revolution at a rolling speed of 40 km/h, respectively.
Figure 14:
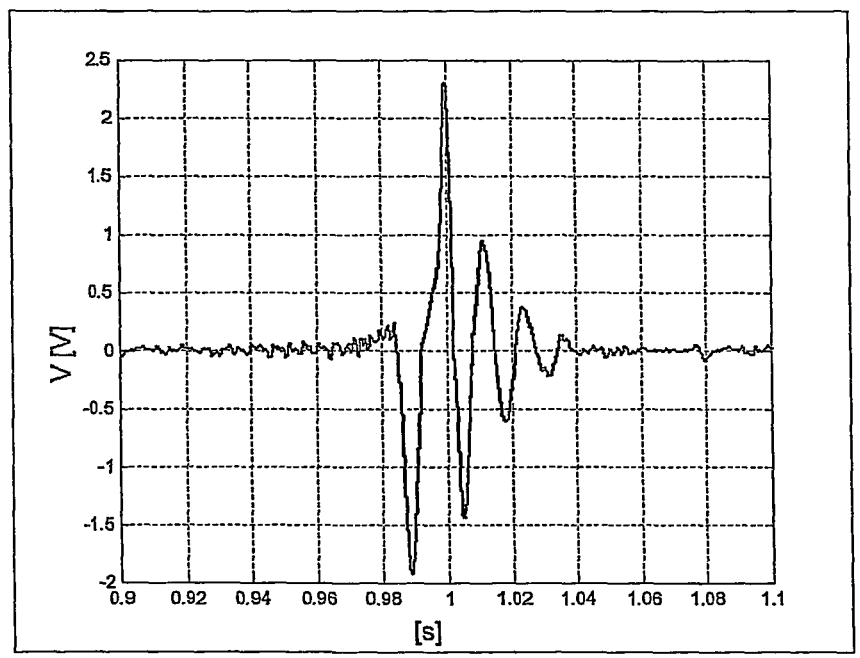
Figure 15:
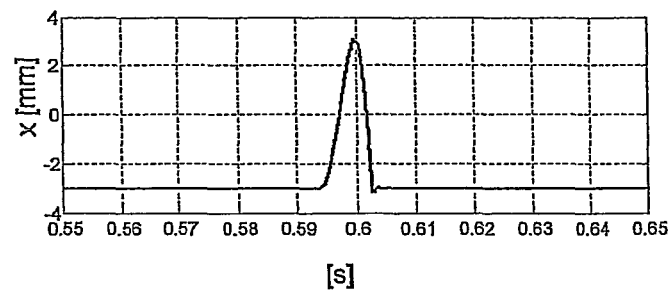
FIG. 15 and FIG. 16 show the position taken up by the movable magnet 12 along the axis X of the simulated energy generation device and the voltage V generated by such a device in one complete tyre revolution at a rolling speed of 80 km/h, respectively.
Figure 16:
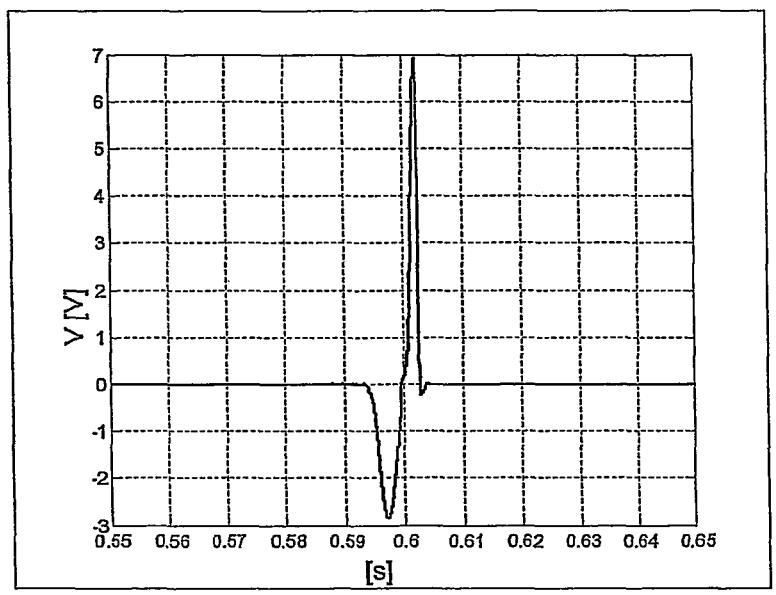
Figure 17:
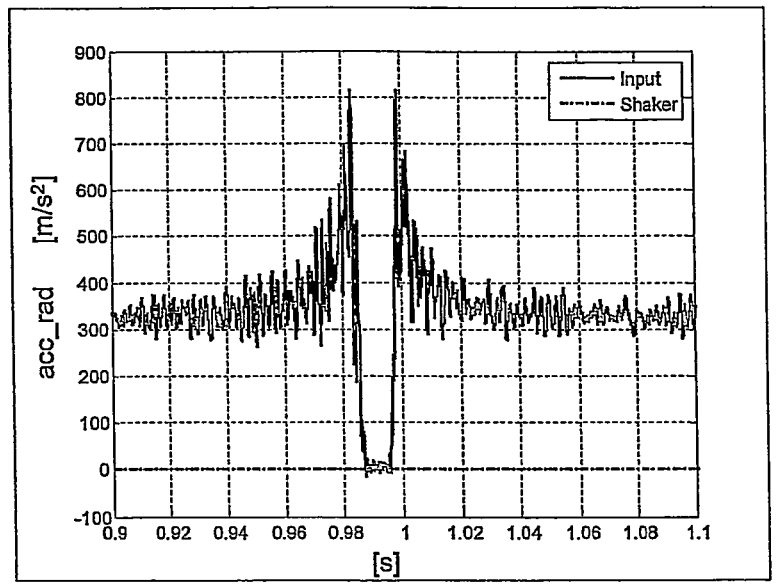
FIG. 17 and FIG. 18 show the radial acceleration profiles to which the simulated energy generation device was subjected, along the longitudinal axis X, during a complete tyre revolution, at a rolling speed of 40 and 80 km/h, respectively.
Figure 18:
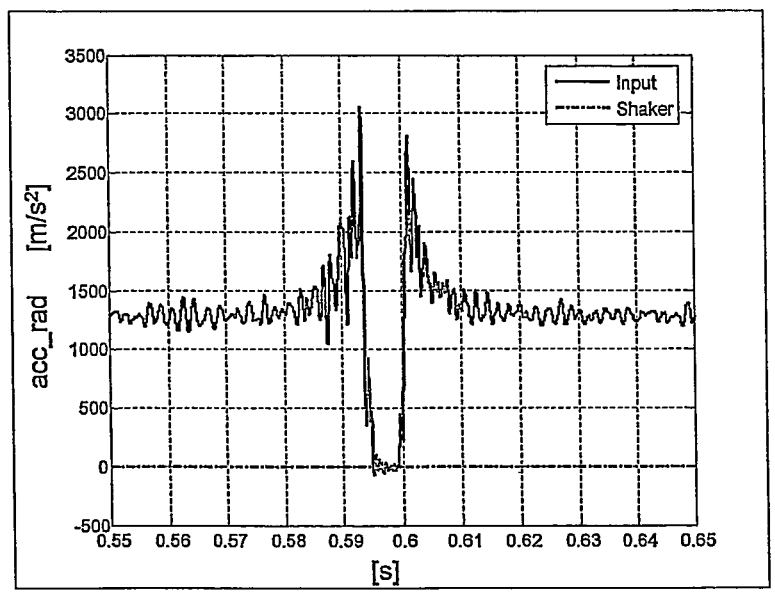

FIG. 13 and FIG. 14 show the position x taken up by the movable magnet 12 along the axis X of the device 1 and the voltage V generated by the device 1 in a complete tyre revolution at a rolling speed of 40 km/h, respectively. In such figures, x=0 represents a position of the magnet 12 in the middle of the housing 10, x<0 represents positions of the magnet 12 towards the outside of the tyre, and x>0 represents positions of the magnet 12 towards the inside of the tyre. FIG. 15 and FIG. 16, on the other hand, show the position taken up by the movable magnet 12 along the axis X of the device 1 and the voltage V generated by the device 1, in a complete tyre revolution at a rolling speed of 80 km/h, respectively. In turn, FIGS. 17 and 18 show the radial acceleration profiles to which the device 1 was subjected, along the longitudinal axis X, during a complete tyre revolution, at a rolling speed of 40 and 80 km/h, respectively.

As can be seen from the results of the simulations carried out, the present invention enables to generate significant average power values (for example 2.2 mW) even at low rolling speeds (for example 40 km/h).

This is particularly advantageous for feeding complex monitoring systems of a tyre that—with respect to simple monitoring systems—require quite high energy supply values (corresponding for example to average powers with time of at least 1-2 mW) both at low and at high rotation speeds of the tyre.

At 160 km/h the aforementioned device enables to obtain an average power value of about 12 mW and, therefore, a ratio between average power generated and volume occupied by the device of about 9.2 mW/cm$^3$.

The invention claimed is:

1. A method for generating electric energy in a tire, comprising:
   attaching a device to a crown portion of the tire, said device comprising:
      a housing attached to the crown portion, the housing having a first end and a second end and extending from the first end to the second end along a longitudinal axis;
      at least one electrical winding;
      a magnet movable within the housing; and
      a force providing element positioned at at least one of the first end and the second end, the magnet being movable with respect to the electrical winding along said longitudinal axis and the force providing element capable of being adapted to exert on the magnet at a force along said longitudinal axis;
   rotating the tire on a rolling surface so as to cause variations of forces acting on the device each time said device passes, due to rolling of the tire, in correspondence of a footprint of the tire;
   exploiting a force exerted by the force providing element and said variations of forces along said longitudinal axis so as to cause variations of magnet position with respect to the at least one electrical winding; and collecting electric energy generated across the at least one electrical winding as a consequence of said variations of the magnet position with respect to the at least one electrical winding.

2. The method according to claim 1, wherein the device is fixed onto said crown portion so that the longitudinal axis of the housing is oriented substantially according to a radial direction of the tire and variations are exploited that a radial force, acting on the device during the rolling of the tire, undergoes along the longitudinal axis of the housing, every time said device passes in correspondence of a footprint of the tire.

3. A tire comprising:
a crown portion;
a monitoring device comprising at least one sensor capable of being adapted to measure at least one operating parameter of the tire;
an energy generation device capable of being adapted to feed energy to said monitoring device, wherein:
said energy generation device comprises:
 a housing attached to the crown portion, the housing having a first end and a second end opposite the first end and extending from the first end to the second end along a longitudinal axis;
 at least one electrical winding;
 a magnet movable within the housing; and
 a force providing element positioned at at least one of the first end and the second end, the magnet being movable with respect to the electrical winding along said longitudinal axis and the force providing element being configured to exert on the magnet a force along said longitudinal axis; and wherein
said at least one electrical winding, said magnet, and said force providing element are configured so that a position of the magnet with respect to the at least one electrical winding varies during rolling of the tire, due to action of a force exerted by the force providing element and to variations undergone by forces acting on the energy generation device every time said device passes, due to the rolling of the tire, in correspondence of a footprint of the tire.

4. The tire according to claim 3, wherein the force providing element being configured to exert a repulsive force on the magnet, an absolute value of the repulsive force of which increases as the magnet approaches an end where the force providing element is positioned.

5. The tire according to claim 3, wherein the energy generation device is associated with said crown portion so that the longitudinal axis of the housing is oriented substantially according to a radial direction of the tire.

6. The tire according to claim 5, wherein the force providing element is positioned at one of two opposite ends of the housing.

7. The tire according to claim 6, wherein the energy generation device is associated with said crown portion so that an end of the housing in which the force providing element is positioned faces, according to a radial direction of the tire, toward the outside of the tire itself.

8. The tire according to claim 3, wherein the force providing element is positioned at the first end and at the second end.

9. The tire according to claim 8, wherein the energy generation device is associated with said crown portion so that the longitudinal axis of the housing is oriented substantially according to a lateral or longitudinal direction of the tire.

10. The tire according to claim 3, wherein the energy generation device comprises at least two electrical windings.

11. The tire according to claim 10, wherein the at least two electrical windings are connected in counter-series.

12. The tire according to claim 10, wherein the at least two electrical windings are spaced apart from each other by means of a spacer comprising two coaxial rings of which one is made from magnetically inactive material and one is made from ferromagnetic material.

13. The tire according to claim 3, wherein the magnet has a residual magnetic induction greater than 1 Tesla.

14. The tire according to claim 10, wherein the force providing element and the magnet are configured so that, at a predetermined rolling speed of the tire, each time that the energy generation device is outside of a footprint, the magnet is, apart from oscillations, in an operating position in which a pattern $d\lambda/dx$ of a total magnetic flux $\lambda$ coupled by turns of said at least two windings, versus a position of the magnet along the longitudinal axis of the housing, has a maximum gradient.

15. The tire according to claim 14, wherein the force providing element and the magnet are configured so that in said operating position of the magnet, the energy generation device has a resonance frequency substantially corresponding to a frequency associated with a higher-order contribution peak of forces acting on the energy generation device along said axis of the housing, at said predetermined rolling speed of the tire.

* * * * *